United States Patent
Molero Leon et al.

(10) Patent No.: US 12,462,937 B2
(45) Date of Patent: Nov. 4, 2025

(54) INTELLIGENT WORKFLOW ANALYSIS FOR TREATING COVID-19 USING EXPOSABLE CLOUD-BASED REGISTRIES

(71) Applicant: Hoffmann-La Roche Inc., Little Falls, NJ (US)

(72) Inventors: Silvia Elena Molero Leon, Heredia (CR); Helene Jeanne Sahri, Basel (CH); Turap Tasoglu, Basel (CH)

(73) Assignee: Hoffmann-La Roche Inc., Little Falls, NJ (US)

( * ) Notice: Subject to any disclaimer, the term of this patent is extended or adjusted under 35 U.S.C. 154(b) by 99 days.

(21) Appl. No.: 17/926,272

(22) PCT Filed: Apr. 22, 2021

(86) PCT No.: PCT/US2021/028647
§ 371 (c)(1),
(2) Date: Nov. 18, 2022

(87) PCT Pub. No.: WO2021/236288
PCT Pub. Date: Nov. 25, 2021

(65) Prior Publication Data
US 2023/0207126 A1 Jun. 29, 2023

(30) Foreign Application Priority Data
May 20, 2020 (EP) .................................. 20175835

(51) Int. Cl.
*G16H 50/20* (2018.01)
*G06N 5/01* (2023.01)
(Continued)

(52) U.S. Cl.
CPC ............... *G16H 50/20* (2018.01); *G06N 5/01* (2023.01); *G16H 10/60* (2018.01); *G16H 50/70* (2018.01); *G16H 50/80* (2018.01)

(58) Field of Classification Search
CPC ....................... G16H 10/00–80/00; G06N 5/01
See application file for complete search history.

(56) References Cited

U.S. PATENT DOCUMENTS

| 11,676,722 | B1 * | 6/2023 | Adib | ....................... G16H 50/20 514/789 |
| 2017/0000422 | A1 * | 1/2017 | Moturu | ................ A61B 5/0022 |

(Continued)

FOREIGN PATENT DOCUMENTS

| JP | 2006-178903 | 7/2006 |
| JP | 2017-527399 | 9/2017 |

(Continued)

OTHER PUBLICATIONS

Alimadadi et al., "Artificial intelligence and machine learning to fight COVID-19," Physiol Genomics 52: 200-202, 2020; First published Mar. 27, 2020; doi: 10.1152/physiolgenomics.00029. 2020. (Year: 2020).*

(Continued)

*Primary Examiner* — Jonathon A. Szumny
(74) *Attorney, Agent, or Firm* — IP Spring

(57) ABSTRACT

Disclosed herein are systems, methods, and techniques for building and using a data platform to facilitate intelligent identification of coronavirus disease 2019 (COVID-19) related diagnoses, treatment selection, and interaction tracing. The present disclosure relates to a cloud-based application that generates outputs predictive of a subject's COVID-19 diagnoses and/or suitability for COVID-19 treatments.

12 Claims, 9 Drawing Sheets

(51) Int. Cl.
  *G16H 10/60*   (2018.01)
  *G16H 50/70*   (2018.01)
  *G16H 50/80*   (2018.01)

(56) References Cited

U.S. PATENT DOCUMENTS

2020/0365270 A1* 11/2020 Kazemi Oskooei ..... G06N 3/08
2020/0373018 A1* 11/2020 Segal ................. G16H 50/70
2022/0087591 A1*  3/2022 Costa ................. A61B 5/7275

FOREIGN PATENT DOCUMENTS

WO   WO-2015118529 A1 *  8/2015  .......... G06F 19/321
WO      2016/040295       3/2016
WO      2017023556 A1     2/2017
WO      2017106770 A1     6/2017
WO      2020/091053       5/2020
WO   WO-2021231274 A1 * 11/2021  .......... C12Q 1/6883

OTHER PUBLICATIONS

Beck et al., "Predicting commercially available antiviral drugs that may act on the novel coronavirus (SARS-CoV-2) through a drug-target interaction deep learning model," Computational and Structural Biotechnology Journal 18 (2020) 784-790; https://doi.org/10.1016/j.csbj.2020.03.025. (Year: 2020).*

Prakash et al., "Analysis, Prediction and Evaluation of COVID-19 Datasets using Machine Learning Algorithms," vol. 8. No. 5, May 2020; International Journal of Emerging Trends in Engineering Research; https://doi.org/10.30534/ijeter/2020/117852020. (Year: 2020).*

Shi et al., "Large-Scale Screening of COVID-19 from Community Acquired Pneumonia using Infection Size-Aware Classification," arXiv:2003.09860. (Year: 2020).*

Wu et al., "Rapid and accurate identification of COVID-19 infection through machine learning based on clinical available blood test results," medRxiv; https://doi.org/10.1101/2020.04.02.20051136. (Year: 2020).*

JPO, Notice of Rejection (with English translation) for Japanese Patent Application No. 2022-570601, Feb. 13, 2024, 8 pages.

EPO, International Search Report for International Patent Application No. PCT/US2021/028647, Dec. 21, 2021, 8 pages.

EPO, Written Opinion for International Patent Application No. PCT/US2021/028647, Dec. 21, 2021, 19 pages.

Schwab, Patrick et al., "preCOVID-19: A Systematic Study of Clinical Predictive Models for Coronavirus Disease 2019," arXiv preprint arXiv:2005.08302 76, Cornell University Library (2020), 8 pages.

Mei, Xueyan et al., "Artificial intelligence-enabled rapid diagnosis of patients with COVID-19," Nature medicine 26.8 (2020), pp. 1224-1228.

Alsdurf, Hannah et al., "COVI White Paper," arXiv preprint arXiv:2005.08502, Cornell University Library (2020), 64 pages.

Sandhu, Rajinder et al., "An intelligent system for predicting and preventing MERS-CoV infection outbreak," The Journal of supercomputing 72.8 (2016), pp. 3033-3056.

Wang, Kun et al., "Clinical Infectious Diseases Clinical Infectious Diseases and Laboratory Predictions of In-hospital Mortality in Patients with Coronavirus Disease—2019: a Cohort Study in Wuhan, China," Clinical infectious diseases 71.16 (2020), pp. 2079-2088.

* cited by examiner

INTELLIGENT WORKFLOW ANALYSIS FOR TREATING COVID-19 USING EXPOSABLE CLOUD-BASED REGISTRIES

CROSS-REFERENCE TO RELATED APPLICATIONS

The present application is a U.S. National Stage filing under 35 U.S.C. § 371 of International Patent Application No. PCT/US2021/028647, filed Apr. 22, 2021, which in turn claims priority under PCT Article 8 and/or 35 U.S.C. § 119(a) to and the benefit of European Patent Application No. 20175835.6, filed on May 20, 2020, the disclosure of each of which are hereby incorporated by reference herein in their entirety for all purposes.

FIELD

Methods and systems disclosed herein relate generally to systems and methods for facilitating intelligent identification of COVID-19-related diagnoses and treatments. More particularly, the present disclosure relates to a cloud-based application that generates outputs predictive of a subject's COVID-19 diagnoses and/or suitability for COVID-19 treatments.

BACKGROUND

Communicable infectious diseases can cause life-threatening harm to human health. Infectious diseases are caused by pathogens, which can be a cellular pathogen (bacteria, parasites and fungi) or an acellular pathogen (viruses, viroids and prions). In the case of viral diseases, acute or chronic respiratory disorders are common. The influenza virus ("flu"), for example, is a well-documented RNA virus in the Orthomyxoviridae family. While the flu virus continues to evolve, typically the evolution occurs in known lineages of the virus's phylogenic tree. The fact that viral lineages of the flu virus are known aids in the diagnosis and treatment of respiratory ailments caused by the flu virus. Thus, the effects of the flu and the treatments, such as the flu vaccine, have been and continue to be well-studied.

A novel virus known as "Severe Acute Respiratory Syndrome Coronavirus 2" (SARS-CoV-2) has been recently discovered. The SARS-CoV-2 virus causes the disease known as Coronavirus Disease-19 (COVID-19). SARS-CoV-2 belongs to a class of genetically diverse viruses found in a wide range of host species, including birds and mammals. Coronaviruses (CoVs) cause intestinal and respiratory infections in animals and in humans. SARS-CoV-2 is the seventh member of the Coronaviridae known to infect humans. Bats are thought to be natural carriers for many SARS-like CoVs.

The scientific community has been racing to understand details of the SARS-CoV-2 virus infection mechanisms. The SARS-CoV-2 virus generally infects cells by binding the angiotension-converting enzyme 2 (ACE2) receptor on the surface of human cells. After the virus enters the cell, the virus fuses with a vesicle and releases the viral RNA. The viral RNA is translated into proteins that are used to assemble new viral particles, that are then released into the body by the infected cell.

Diagnosing and treating COVID-19 is a significant challenge, given the fast-paced release of studies, which are now frequently published after bypassing peer review. The informational landscape relating to COVID-19 evolves quickly as new information comes to light almost daily. Further, diagnosing COVID-19 requires knowledge of the specific genes in the SARS-CoV-2 virus that are different from other coronaviruses to provide an accurate Polymerase Chain Reaction (PCR) test. Otherwise, the test may amplify genes from related coronaviruses and produce a false positive result. Development of serology tests requires isolation of antibodies from subjects who were infected by the virus, which requires obtaining samples from previously infected subjects and identifying the antibodies that specifically bind SARS-CoV-2 viral antigens.

Additionally, determining effective treatments for COVID-19 is a challenge because coronaviruses are RNA viruses. When RNA viruses are outside of a host, they are dormant, but remain infectious for hours to days. After the virus infects a cell, it can make 10,000 copies of itself in a few hours, resulting in hundreds of millions of viral particles per teaspoon of blood. Because RNA viruses use the host's own proteins to replicate, many drugs that attack the virus also harm the host cells. Therefore, antiviral drugs typically must be very specific and target only the unique viral proteins. Accordingly, the active drugs are specific to each virus and generally are not effective with other viruses.

The virus is also able to mutate relatively rapidly to escape detection by the host immune system and infect new species of hosts. However, the virus has a proofreading protein that allows it to correct some errors when copying the genetic material. The ability to mutate while replicating in the host means that some viruses can become resistant to antiviral drugs. This shortens the effective life of active drugs, and, similar to HIV, may require multiple drug "cocktails" to make sure the virus is not resistant to all the drugs in the cocktail.

Clinical predictive models that estimate which patients will be likely to receive a positive COVID-19 diagnosis or require hospitalization or intensive case have been described by SCHWAB ET AL.: "predCOVID-19: A Systematic Study of Clinical Predictive Models for Coronavirus Disease 2019", ARXIV.ORG, 17 May 2020, XP081675049. These models use machine learning based on routinely collected clinical data. Evaluation of whether various treatments would be suitable for a particular subject, do not appear to be described.

The use of artificial intelligence algorithms to integrate chest CT findings with clinical symptoms, exposure history, and laboratory testing to rapidly diagnose COVID-19 has been described by MEI ET AL.: "Artificial intelligence-enabled rapid diagnosis of patients with COVID-19", NATURE MEDICINE, vol. 26, no. 8, 19 May 2020, pages 1224-1228. Evaluation of whether various treatments would be suitable for a particular subject, do not appear to be described.

Machine learning has also been applied in the contact tracing context. ALSDURF ET AL.: "COVI White Paper", ARXIV.ORG, 8 May 2020, XP081671734, describes a COVID-19 public peer-to-peer contact tracing and risk awareness mobile application that takes advantage of machine learning to optimize and automate the integration of clues regarding the possibility that a person is infected, and uses the resulting graded risk levels to drive appropriate recommendations and signals sent to users so they can update their own risk assessment. Such a mobile application, however, only allows users to assess whether they may have had a potential exposure to the SARS-CoV-2 virus, but does not provide any specific diagnosis or treatment of COVID-19.

More generally, digital personalized medicine systems are also known. For example, PCT International Application Publication WO 2017/106770, provides a system that uses digital data to assess or diagnose symptoms of a patient, with feedback from the patient response to treatment considered for updating personalized therapeutic interventions. Specific applications to cognitive, developmental, neurodegenerative, and behavioral disorders are described, but a discussion of viral diseases or respiratory conditions like COVID-19 are not disclosed.

In light of the challenges of diagnosing and treating COVID-19 and despite attempts to personalize diagnoses or viral exposure using digital data, improved methods and systems for collecting data from COVID-19 subjects and processing the collected data to facilitate intelligent identification of COVID-19-related diagnoses and treatments are desired. In particular, a system that supports rapid collection and processing of big data pertaining to COVID-19 may allow medical professionals to more quickly understand how the disease affects different people and which treatments are likely to be effective in particular circumstances.

SUMMARY

In some embodiments, a computer-implemented method is provided. The computer-implemented method may include receiving input corresponding to a selection of an identifier of a subject record associated with a subject. The identifier of the subject record may be selected using an interface. The computer-implemented method may also include retrieving the subject record from a data store. The subject record may include a set of subject attributes. The computer-implemented method may also include generating an array representation for the subject, and inputting the array representation for the subject into a trained machine-learning model to generate an output, such as an output that is size-reduced. For example, the array representation may be generated by transforming the set of subject attributes into the array representation represented in a domain space. The trained machine-learning model may include a set of parameters that were learned using a set of other subject records stored in a data registry. Each other subject record of the set of other subject records may be associated with another subject who was infected with COVID-19 and subsequently treated using a treatment. The computer-implemented method may also include one or more functions configured to transform array-representation input into size-reduced output using the set of parameters. The computer-implemented method may also include determining, based on the output, that the subject record corresponds to criteria of a COVID-19 diagnosis and/or factors indicative of suitability of a particular COVID-19 treatment. The computer-implemented method may include outputting an indication that the subject record corresponds to the criteria of a COVID-19 diagnosis and/or factors indicative of suitability of a particular COVID-19 treatment.

Implementations may include one or more of the following features. The computer-implemented method may further include, in response to determining that the subject record corresponds to the criteria of a COVID-19 diagnosis: executing an interaction tracing protocol configured to detect an identity of one or more potential human interactions with the subject. The execution of the interaction tracing protocol may include inputting the array representation for the subject into another trained machine-learning model. The other trained machine-learning model may have been trained to generate another output indicative of potential interaction locations of subjects. The computer-implemented method may also include determining, based on the other output of the other trained machine-learning model, a set of potential interaction locations associated with the subject. Each potential interaction location of the set of potential interaction locations indicating a prediction of a potential location or location type to which the subject traveled. The computer-implemented method may also include determining a number of days since the subject began exhibiting symptoms. The number of days since the subject began exhibiting symptoms may be indicative of a size of a viral load having been released by the subject.

The computer-implemented method may also include selecting an incomplete subset of the set of potential interaction locations. A size of the incomplete subset selected from the set of potential interaction locations may be determined based on the number of days since the subject began exhibiting symptoms. The computer-implemented method may also include generating a communication workflow for causing a communication to be transmitted notifying one or more individuals associated with each potential interaction location of the incomplete subset of the set of potential interaction locations. The communication may be transmitted upon receiving authorization from the subject. One or more responses to the communication may be received. The computer-implemented method may also include identifying the one or more potential human interactions using the one or more responses to the communication. The computer-implemented method may also include generating, for each potential human interaction of the one or more potential human interactions, a test-request workflow for assigning a COVID-19 test to the potential human interaction. The computer-implemented method may further include, in response to determining that the subject record corresponds to the criteria of a COVID-19 diagnosis: inputting the set of other subject records into a random forest model. The random forest model may define a tree structure associated with the set of other subject records. The tree structure may include one or more nodes, and each node of the one or more nodes may represent a subset of the set of other subject records.

The computer-implemented method may also include processing the set of other subject records using the random forest model. The processing may include determining one or more segmenting thresholds for segmenting the set of other subject records into one or more subsets of subject records. Each subset of subject records may correspond to a leaf node of the tree structure. The leaf node representing a subject outcome. Each segmenting threshold of the one or more segmenting thresholds may cause the tree structure to branch into one or more child nodes. The computer-implemented method may also include selecting a subset of the one or more subsets of subject records. The selected subset may correspond to subjects who have been discharged after recovering from COVID-19. The computer-implemented method may also include determining a set of treatments associated with the selected subset. Each treatment of the set of treatments may have been prescribed to at least one of the subjects who have been discharged after recovering from COVID-19. The computer-implemented method may also include presenting, on the interface, the set of treatments as proposed treatments for treating the subject. Processing the set of other subject records may further include determining one or more characteristics associated with the selected subset. Each characteristic of the one or more characteristics may be determined based on a segmenting threshold of the one or more segmenting thresholds. Each characteristic may contribute to filtering the set of other subject records into the selected subset. The computer-implemented method may also include determining a similarity metric between the subject record and the one or more characteristics of the selected subset. The computer-implemented method may also include determining a confidence score for each proposed treatment of the set of treatments. The confidence score may be determined based on the similarity metric. The set of subject attributes characterizing the subject may include any one or more from a group comprised of: one or more comorbidities, a smoking status of the subject, a suspected diagnosis of a viral disease, a confirmed diagnosis of a viral disease, a testing technology used to confirm a diagnosis, or a treatment for a disease or condition.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

Some embodiments of the present disclosure include a system including one or more processors. In some embodiments, the system includes a non-transitory computer readable storage medium containing instructions which, when executed on the one or more processors, cause the one or more processors to perform part or all of one or more methods and/or part or all of one or more processes disclosed herein. Some embodiments of the present disclosure include a computer-program product tangibly embodied in a non-transitory machine-readable storage medium, including instructions configured to cause one or more processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The present disclosure is described in conjunction with the appended figures.

Figure 1:
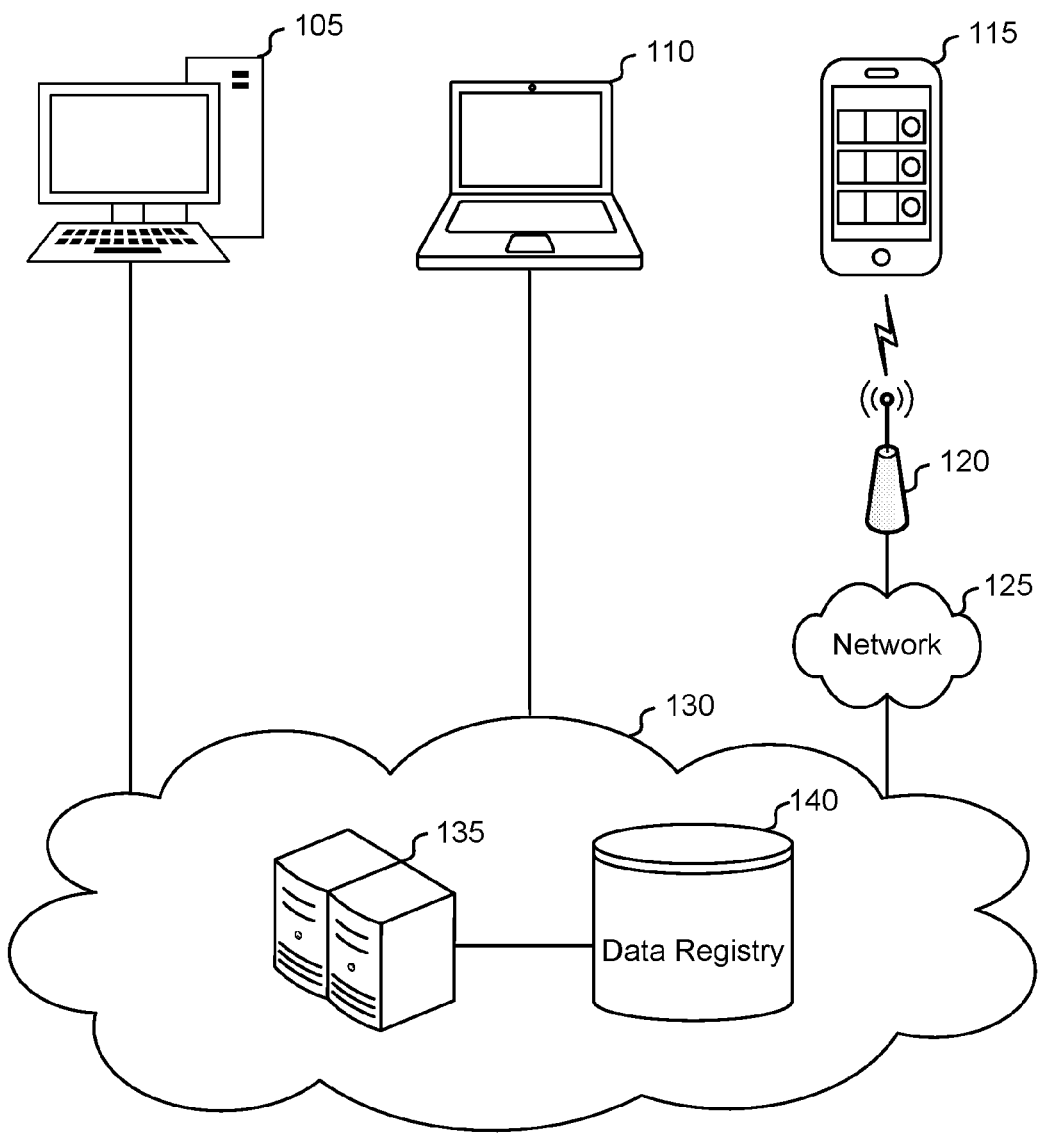
FIG. 1 illustrates a network environment in which the cloud-based application is hosted, according to some aspects of the present disclosure.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

I. Overview

COVID-19 is characterized by uncertainty. While experts have detected the pathogen causing COVID-19 (i.e., SARS-CoV-2), many other characteristics of SARS-CoV-2 are unclear and still being studied. For example, the list of potential COVID-19 treatments is frequently changing, and selecting an "optimal" treatment for a given subject is thus challenging. Further complicating the treatment of COVID-19, SARS-CoV-2 can evolve at a fast pace and dramatically. The phylogenetic tree of SARS-CoV-2 appears to have at least three genomes (and potentially more as additional research is conducted). The evolutionary selection of particular virus mutations can occur slightly differently in two different human hosts, which complicates the phylogenetic tree. A complicated phylogenetic tree increases the complexity of testing for COVID-19, detecting symptoms of COVID-19, and treating COVID-19. Further, SARS-CoV-2 uses the host cell's proteins to replicate. If antiviral drug therapy is provided to attack SARS-CoV-2, the antiviral drug also harms the host cell. Thus, prescribing suitable treatments to COVID-19 subjects in a specific and targeted manner to target only the unique viral proteins of SARS-CoV-2 is a challenging and risky task.

Additionally, manifestation of COVID-19 is characterized by variability. In many cases, SARS-CoV-2 harms a subject's lungs and airways. In some cases, SARS-CoV-2 also harms other organs, such as nervous systems and hearts. Thus, the knowledge base of COVID-19 symptoms can change quickly as new studies are released. For example, experts initially determined that children tend to have milder symptoms of COVID-19. However, as new studies were released, experts have only recently determined that SARS-CoV-2 can trigger inflammation ad an immune system overreaction, known as Kawasaki disease.

The transmissibility of SARS-CoV-2 is also still unclear. As an RNA virus, SARS-CoV-2 may be dormant outside of a host cell, while remaining infectious for hours to days. Once inside a host cell, SARS-CoV-2 can make 10,000 copies of itself in a few hours, which can result in hundreds of millions of viral particulars per teaspoon of blood. SARS-CoV-2 can also infect others by inhalation of droplets exhaled by an infected subject. For example, breathing and speaking can cause a subject to exhale droplets, however, the extent to which SARS-CoV-2 is infectious in exhaled droplets is still being evaluated.

The studies released by research or medical institutions can also create uncertainty. For example, initially, studies from France indicated that hydroxychloroquine (an antimalarial drug) could effectively treat COVID-19. However, a short time later, experts determined that the studies were flawed. In addition, the speed at which research institutions are releasing studies has encouraged a number of research institutions to bypass peer review of their studies. Thus, certain treatments for COVID-19, which are determined based on findings from studies, may not be suitable for prescribing to COVID-19 subjects.

In light of the complexities of diagnosing and treating COVID-19 subjects, techniques described herein relate to a cloud-based application that enables care providers (e.g., physicians) to collect information on subjects with a suspected or confirmed diagnosis of COVID-19 and to facilitate intelligent selection of COVID-19 treatments using trained machine-learning or artificial-intelligence models. Trained machine-learning or artificial-intelligence models can detect information and/or patterns within a subject's record (e.g., an electronic health record) that (for example) are consistent with COVID-19 data (e.g., and thus suggestive of a COVID-19 diagnosis) and/or that corresponds to a prediction that are particular treatment may be more effective in treating the subject as compared to other available treatments (e.g., as assessed based on predicted survival, predicted progression-free survival and/or predicted time to stable recovery from some or all symptoms). The predicted or recommended treatments serve to assist care providers in treating COVID-19 subjects.

Building a dynamic cloud-based platform that executes trained artificial intelligence (AI) models to frequently process new data may be extraordinarily valuable in tackling COVID-19. Having trained AI models that can frequently and/or repeatedly monitor recent data to detect new diagnosis and treatment information from the ever-changing landscape of COVID-19 can substantially advance medicine. For example, an AI model may detect new symptom profiles that are associated with COVID-19 diagnoses, new associations between subject characteristics and prescriptions of particular treatments, and/or new predictors as to how COVID-19 subjects will respond to one or more particular treatments. A cloud-based platform can further aggregate data from across many institutions in many locations (e.g., different countries) in a manner that complies with applicable data-privacy regulations and standards. This aggregation can increase the size and variability of a data set that can be used to train the AI model, which can increase the accuracy of the model. Thus, a cloud-based application that uses a trained AI model may then be used to process data corresponding to a particular subject to predict (for example) whether the subject has COVID-19; a prognosis for the subject; and/or how the subject would respond to each of one or more different treatments. to predict responsiveness to treatment, for example, can be a significant technical advantage in the complex and fast-paced environment of COVID-19 research.

As an illustrative example, a subject who recently began experiencing COVID-19-related symptoms, such as a fever and shortness of breath, may be admitted into a medical facility. A physician treating the subject may suspect that the subject has COVID-19, and thus, the physician may input the subject's symptoms and demographic information into the cloud-based application. The symptoms and demographic information can be stored as subject attributes in the subject's record, which is stored in a data registry. The subject record may further be updated to include automatically detected data points (e.g., a date and physical location associated with the data entry, which may then be estimated to correspond to a date and location at which the subject was experiencing the symptoms). Thus, as an advantage, the cloud-based application enables physicians to collect information from subjects in an organized manner.

Continuing with the illustrative example, the cloud-based application can also input the subject's record into a trained machine-learning or artificial-intelligence model to generate outputs that assist the treating physician in determining whether to diagnose the subject with COVID-19, and if diagnosed, a suitable treatment plan for the subject. For example, the cloud-based application may return a result predicting—based on the symptoms, demographic information and a location associated with the subject—there is a 94% probability that the subject has COVID-19.

The artificial-intelligence model may further be used to identify a treatment for a particular subject and/or to predict how effective each of one or more treatments would be in treating the particular subject. For example, the cloud-based application may return a result that identifies Actemra® (tocilizumab) as a treatment associated with a highest predicted progression-free survival (at 4 weeks after treatment initiation) for the subject associated with the symptoms.

The artificial-intelligence model can be configured or can learn to evaluate one or more of multiple results and/or endpoints to assess how responsive subjects were to a given treatment and/or to assess an efficacy of a given treatment. Results that may be assessed may include (for example) whether and/or when a subject was discharged from a hospital, whether a subject died (e.g., due to COVID-19 or for any reason), whether and/or an extent to which COVID-19 symptoms worsened, whether and/or an extent to which a subject's COVID-19 symptom-severity classification progressed, and/or whether and/or an extent to which a subject's viral load changed. Results may be tracked with respect to one or more particular time points (e.g., two or four weeks after treatment initiation) and/or less rigidly (e.g., merely associating each result with a corresponding time point). An effective treatment may be defined or learned to be a treatment that (for example) is associated with subsequent hospital discharge, survival, reduced or relieved symptoms, improved symptom-severity classifications and/or reduced or cleared viral load. While these endpoints are illustrative of the types of results that may be used to characterize past treatment responsiveness and/or to predict other subjects' treatment responsiveness, the artificial-intelligence model may learn that other informative results are informative in this regard.

In some instances, an artificial-intelligence model is trained (e.g., in a supervised manner) to learn parameters that can be used to transform subject-record data into predictions pertaining to effects of a treatment. The artificial-intelligence model may include a supervised model that is trained to predict the treatment effects, such as a neural network (e.g., a feedforward network, recurrent network and/or deep network), a regression model, or a support vector machine. The artificial-intelligence model may include an unsupervised model that is trained to identify similarities in input data sets, such as a clustering model (e.g., a principal component analysis model) or nearest-neighbor model.

For example, diagnosis and/or treatment predictions may be generated by identifying one or more similar subjects to the subject and assessing treatment prescriptions and treatment-efficacy data associated with the similar subjects. Similar subjects may be identified by processing record data associated with a population of subjects using a nearest neighbor technique. The cloud-based application can evaluate the similar subjects' records to (for example) identify a set of COVID-19 treatments or classes of treatments that were provided to the similar subjects and potentially by tracking subjects' health attributes monitored subsequent to the treatment.

In some examples, the cloud-based application can generate outputs predictive of the subject's responsiveness to certain treatments. An interface may present the predicted responsiveness and may potentially present part or all of the record (e.g., which may be redacted and/or partly obscured) of the similar subject(s) so that a user can compare attributes of the similar subject with a subject of interest and/or view more complete data indicative of treatment history and/or response. The interface can thus facilitate a care provider making an informed decision as to the COVID-19 diagnosis and/or the COVID-19 treatment (e.g., based on a score representing a degree to which the subject is predicted to respond to the proposed treatment). The cloud-based application can also be configured to perform actions that assist care providers in contact tracing. For example, when the cloud-based application can classify or segment subjects based on certain attributes, and then generate a prediction of areas that the subject is likely to have visited.

In some embodiments, an entity, such as a medical center or a research facility, may operate an on-premises or remote network that stores data. The data may include unstructured data, such as electronic copies of physician notes and/or responses to open-ended questions. The unstructured data can be ingested into the data registries by mapping portions of the unstructured data to fixed parts (e.g., data fields) of structured data records. The structure of the structured data records may be defined using (for example) specifications from a module that corresponds to a particular use case (e.g., particular disease, particular trial, etc.). For example, unstructured note data may be converted and condensed to identify whether the note data indicates which (if any) of a particular set of symptoms the subject exhibits. Some portions of the note data may be irrelevant with regard to fields in the structured data and/or may be more or less specific than field data. Thus, various mapping (e.g., mapping a "poor balance" symptom to a "neurological" symptom), natural-language-processing, or interface-based approach (e.g., that requests new information from a user) can be used to facilitate obtaining structured data records. An interface may also be used to receive input that identifies new information about a new or existing subject, and the interface may include input components and selection options that map to a structure of data records.

Further, techniques relate to configuring a cloud-based application to execute intelligent analytical functionality to process the structured data records stored in the data registries. Intelligent analytical functionality may be performed by executing trained machine-learning or artificial-intelligence models using data records. The model outputs may be used to indicate certain analytics extracted from the data records.

Additionally, techniques relate to configuring a cloud-based application to execute data-privacy protocols that enable an entity to transmit and/or receive one or more data records or other information characterizing subjects (e.g., experiencing medical symptoms and/or having a possible or confirmed diagnosis of a medical condition) with external entities, while satisfying the constraints imposed by data-privacy rules across various jurisdictions. The cloud-based application can be configured to algorithmically assess data-privacy violations and automatically omit, obfuscate or otherwise modify data records to comply with data-privacy rules.

In some instances, transmission of data from a data record may be provided to facilitate developing a treatment plan for an individual subject. For example, data-record information (e.g., that complies with data-privacy restrictions via, for example, select omission and/or obscuring of data) may be broadcast and/or availed to a select group of users. For example, a broadcast may be sent to users associated with similar data records in response to input from the user corresponding a request to initiate a consult with a user associated with a similar subject. If a user receiving the broadcast accepts a consultation request (via provision of corresponding input), a secure data channel may be established between the user and potentially more of the data record may be shared (e.g., while conforming to data-privacy restrictions applicable to the two users). As another example, a processed data record may be returned in response to a query for records matching particular constraints. In some instances, a first user may submit a query that identifies a first data record and that requests that similar data records be identified. A computing system may then perform a data-processing technique (e.g., nearest-neighbor technique) to identify similar records. Various data fields may be differentially weighted in this search (e.g., in accordance with predefined field weightings, user input that indicates an importance of matching various fields, and/or a prevalence of particular field values across a record set). When searching across a set of records for potential matches, some records may lack values for various fields. In these cases, it may be determined that (for example) the field values do not match and/or the field may be unweighted when evaluating the potential match. Handling of the missing-value may depend on a distribution of values for the field across the set of records and/or the value for the field in the query.

Further, some techniques relate to defining and using a set of rules used to identify potential treatment regimens for a subject given a set of symptoms identified in structured data. The set of rules may be defined based on a user interaction with a user interface, which may include specifications of particular criteria and an associated particular medical treatment and/or selection of one or more previously defined rules (that specify criteria and a treatment). For example, one or more existing rules may be presented via an interface, and a user may select rules to incorporate into a rule-base associated with an account associated with the user. The one or more rules may be selected from amongst a set of rules defined by multiple users (e.g., associated with one or more institutions) and/or may be generated based on rules generated by multiple users. For example, a computing system may detect that rules that relate one or more particular types of symptoms and/or test results to a given treatment are relatively frequently defined and/or selected by users, and the computing system may then generate a general rule pertaining to the particular types of symptoms and/or test results and to the treatment. The general rule may be defined to have (for example) a most restrictive, most inclusive or median criteria. In some instances, a rule base of a user can be processed to detect any criteria overlap between rules. Upon identifying an overlap, an alert may be presented that identifies the overlap. A rule of a rule base may be used to evaluate a subject record to classify to define a population associated with the subject record. Evaluating the subject record using the rule may be performed as a decision tree, for example, in that a first criterion of the rule is compared against the attributes included in the subject record. If the first criterion is satisfied, then the next criterion is compared against the attributes included in the subject record. If the next criterion is satisfied, then the comparisons continue for each criterion included in the rule. The comparisons may continue even if the next criterion is not satisfied. In this case, the non-satisfaction of the criterion (and any others included in the rule) is stored and presented to a user device, along with the criteria that were satisfied.

Accordingly, embodiments of the present disclosure provide a technical advantage over conventional systems by providing a cloud-based application configured to exchange subject information with external entities without violating data-privacy rules. The cloud-based application is configured to automatically assess data-privacy rules involved in sharing subject information across various jurisdictions. The cloud-based application is configured to execute protocols that obfuscate or otherwise modify the subject information, thereby algorithmically ensuring compliance with the data-privacy rules.

While the disclosure above describes a cloud-based application configured to perform intelligent functionality with respect to facilitating diagnosis and treatment of COVID-19, the cloud-based application may be configured to identify potential diagnoses or potential treatments for any disease, condition, area of study, or disorder, including, but not limited to, oncology, including cancers of the lung, breast, colorectal, prostate, stomach, liver, cervix uteri (cervical), esophagus, bladder, kidney, pancreas, endometrium, oral, thyroid, brain, ovary, skin, and gall bladder; solid tumors, such as sarcomas and carcinomas, cancers of the immune system including lymphomas (such as Hodgkin or non-Hodgkin), and cancers of the blood (hematological cancers) and bone marrow, such as leukemias (such as Acute lymphocytic leukemia (ALL) and Acute myeloid leukemia (AML)), lymphomas, and myeloma. Additional disorders include blood disorders such as anemia, bleeding disorders such as hemophilia, blood clots, ophthalmology disorders, including diabetic retinopathy, glaucoma, and macular degeneration, neurological disorders, including multiple sclerosis, Parkinson's, disease, spinal muscular atrophy, Huntington's Disease, amyotrophic lateral sclerosis (ALS), and Alzheimer's Disease, autoimmune disorders, including multiple sclerosis, diabetes, systemic lupus erythematosus, myasthenia gravis, inflammatory bowel disease (IBD), psoriasis, Guillain-Barre syndrome, Chronic inflammatory demyelinating polyneuropathy (CIDP), Graves' disease, Hashimoto's thyroiditis, eczema, vasculitis, allergies and asthma.

Other diseases and disorders include but are not limited to kidney disease, liver disease, heart disease, strokes, gastrointestinal disorders such as celiac disease, Crohn's disease, diverticular disease, Irritable Bowel Syndrome (IBS), Gastroesophageal Reflux Disease (GERD) and peptic ulcer, arthritis, sexually transmitted diseases, high blood pressure, bacterial and viral infections, parasitic infections, connective tissue diseases, celiac disease, osteoporosis, diabetes, lupus, diseases of the central and peripheral nervous systems, such as Attention deficit/hyperactivity disorder (ADHD), catalepsy, encephalitis, epilepsy and seizures, peripheral neuropathy, meningitis, migraine, myelopathy, autism, bipolar disorder, and depression.

II. Summary of the Virology, Epidemiology, Clinical Symptoms, Diagnoses, and Treatments of COVID-19

COVID-19 is the disease caused by a novel coronavirus called SARS-CoV-2. SARS-CoV-2 belongs to a class of genetically diverse viruses found in a wide range of host species, including birds and mammals. Coronaviruses (CoVs) cause intestinal and respiratory infections in animals and in humans. SARS-CoV-2 is the seventh member of the Coronaviridae known to infect humans, and coronaviruses (CoVs). Bats are thought to be natural carriers for many SARS-like CoVs; especially the COV species of Alphacoronavirus and Betacoronavirus.

The SARS-CoV-2 virus infects cells by binding the ACE2 receptor on the surface of human cells. After the virus enters the cell, the virus fuses with a vesicle and releases the viral RNA. The viral RNA is translated into proteins that are used to assemble new viral particles, which are then released into the body by the infected cell.

The epidemiology of COVID-19 is thought to have started with a local outbreak in Wuhan City, Hubei Province of China, where some of the initial subjects were exposed in a market that sold wildlife species including bats. Epidemiologic analysis suggests that in the initial phase, person-to-person transmission occurred by close contact. The second phase was characterized by transmission within hospitals and within families. The third phase is characterized by a rapid increase of so-called "cluster cases" that are concentrated in a particular location or in a particular group of people, such as an extended family.

The symptoms of COVID-19 include fever, cough, shortness of breath (dyspnea), muscular soreness, chills, sore throat, and a new loss of taste or smell. Less common symptoms include gastrointestinal symptoms like nausea, vomiting, or diarrhea. In addition, older adults and people who have severe underlying medical conditions like heart or lung disease or diabetes seem to be at higher risk for developing more serious complications from COVID-19 illness. For example, 8 out of 10 deaths reported in the U.S. have been in adults aged 65 years old and older.

II.A. Diagnostic Tests for Testing SARS-CoV-2

A cloud-based application may process subject-specific data that includes a result of a COVID-19 test used to inform COVID-19 diagnosis decisions and/or may generate an output (generated based on processing of a subject-specific input data set) that corresponds to a recommendation that a COVID-19 test be prescribed for the subject. The COVID-19 test can include (for example) one or more tests identified in this section.

According to the Centers for Disease Control and Prevention, there are currently two types of tests available for diagnosing the COVID-19 disease: tests for current infection (viral tests) and tests for past infection (antibody tests). Viral tests generally detect a molecule in the coronavirus genetic material by amplifying SARS-CoV-2 specific genes using a technique such as polymerase chain reaction (PCR), reverse-transcription-PCR (RT-PCR), or isothermal nucleic acid amplification. For example, F. Hoffman-La Roche AG offers the Cobas® SARS-CoV-2 test, which is a real-time RT-PCR test designed for the qualitative detection of SARS-CoV-2 in nasopharyngeal and oropharyngeal swab samples from subjects. Other commercially-available COVID-19 PCR tests include, but are not limited to, the COVID-19 Assay PCR test provided by Diagnostic Solutions Laboratory®; the SARS-CoV-2 Molecular Detection Assay, which is a PCR test provided by Mayo Clinic Laboratories; the Fast Track Diagnostics (FTD) SARS-CoV-2 Assay, which is a PCR test provided by Seimens Healthineers/Fast Track Diagnostics; the SARS-CoV-2 PCR Assay provided by Stanford Health Care Clinical Virology Laboratory; the RealTime SARS-CoV-2 EUA Test, which is a PCR test provided by Abbott®; and any other suitable commercially-available COVID-19 diagnostic test.

Other tests include detecting an antigen present on the coronavirus, such as the surface spike proteins (e.g., by binding to an antibody that specifically recognizes the antigen). For example, Quidel® provides the Sofia 2 SARS Antigen FIA test. Viral tests typically are useful for diagnosing current, active infections by the coronavirus, and cannot determine if a subject was previously infected and has recovered.

Serological or antibody tests detect antibodies produced in the body of a subject who was infected by the virus and has recovered. Serological tests are useful for detecting individuals whose symptoms were mild or were asymptomatic. Infection by SARS-CoV-2 triggers an immune response against viral antigens, including the production of Immunoglobulin M (IgM) and Immunoglobulin G (IgG) antibodies. These antibodies are detectable several days after infection, but can persist in the blood for many years, which allows for detecting past infections. For example, F. Hoffman-La Roche AG offers the Elecsys® Anti-SARS-CoV-2 test, which is a serological test designed for detecting a subject's immune response to SARS-CoV-2. The Elecsys® Anti-SARS-CoV-2 test is an immunoassay intended for qualitative detection of antibodies to SARS-CoV-2 in human serum and plasma (K2-EDTA, K-EDTA, Li-heparin, etc.). Other commercially-available COVID-19 serological tests include, but are not limited to, the SARS-CoV-2 IgG test provided by Abbott®; the CoreTest COVID-19 IgM/IgG Ab test provided by Core Technology®; the SureScreen COVID-19 IgM/IgG Rapid Test Cassette provided by SureScreen Diagnostics®; and any other suitable commercially-available serological test.

Diagnostic testing classifies subjects with COVID-19 into the following illness categories:

Asymptomatic or Presymptomatic Infection: Individuals who test positive for SARS-CoV-2 but have no symptoms;

Mild Illness: Individuals who have any of various signs and symptoms (e.g., fever, cough, sore throat, malaise, headache, muscle pain) without shortness of breath, dyspnea, or abnormal imaging;

Moderate Illness: Individuals who have evidence of lower respiratory disease by clinical assessment or imaging and a saturation of oxygen (SpO2)>93% on room air at sea level;

Severe Illness: Individuals who have respiratory frequency >30 breaths per minute, SpO2≤93% on room air at sea level, ratio of arterial partial pressure of oxygen to fraction of inspired oxygen (PaO2/FiO2) <300, or lung infiltrates >50%; and Critical Illness: Individuals who have respiratory failure, septic shock, and/or multiple organ dysfunction.

Due to insufficient data, the U.S. National Institute of Health (NIH) does not recommend either for or against any antiviral or immunomodulatory therapy in subjects with mild to severe COVID-19.

II.B. Known Treatments for COVID-19

As mentioned, a cloud-based application and/or artificial-intelligence model described herein can be used to identify a recommended treatment for a particular subject and/or to predict how a subject will respond to a given treatment. For example, a cloud-based application may predict, for each of one or more treatments described in this section (and/or for one or more other treatments subsequently used for COVID-19 treatment), a probability that the treatment will result in full symptom recovery within three weeks. The cloud-based application may then identify a single treatment associated with a highest recovery probability for potential use by the subject.

Current treatment options for COVID-19 include antivirals, immune-based therapies, neutralizing antibodies, and mechanical ventilators for subjects with respiratory failure. For example, a current treatment option for COVID-19 includes antivirals, such as Remdesivir for hospitalized subjects with severe disease, defined as SpO2<94% on ambient air (at sea level), requiring supplemental oxygen, mechanical ventilation, or extracorporeal membrane oxygenation. In the U.S., Remdesivir is not currently approved by the U.S. Food and Drug Administration (FDA), but is available through an FDA emergency use authorization for the treatment of hospitalized adults and children with COVID-19. Remdesivir is also being investigated in clinical trials, and it is available through an emergency access program for children and pregnant subjects.

The NIH recommends against using high-dose chloroquine (600 mg twice daily for 10 days) for the treatment of COVID-19, because the high dose carries a higher risk of toxicities than the lower dose. Other antivirals include azithromycin and the HIV protease inhibitors Lopinavir/ritonavir. However, except in the context of a clinical trial, the NIH recommends against the use of the following drugs for the treatment of COVID-19:

The combination of hydroxychloroquine plus azithromycin (AIII) because of the potential for toxicities; and Lopinavir/ritonavir (AI) or other HIV protease inhibitors (AIII) because of unfavorable pharmacodynamics and negative clinical trial data.

Other antivirals include Favipiravir, which is approved in some countries to treat influenza, and Arbidol, which was tested in combination with the drug lopinavir/ritonavir as a treatment for COVID-19.

Another treatment option includes immune-based therapies, such as convalescent plasma and SARS-CoV-2-specific immune globulins. The NIH currently believes there are insufficient data to recommend either for or against the use of COVID-19 convalescent plasma or SARS-CoV-2 immune globulins for the treatment of COVID-19. However, the NIH recommends against the use of non-SARS-CoV-2-specific IVIG for the treatment of COVID-19, except in the context of a clinical trial. This should not preclude the use of IVIG when it is otherwise indicated for the treatment of complications that arise during the course of COVID-19.

Another treatment option includes immune suppressant drugs to treat the so-called "cytokine storm" associated by COVID-19 infection in subjects that develop acute respiratory distress syndrome (ARDS). Several immunosuppressants are being tested in clinical trials, including baricitinib (a drug for rheumatoid arthritis); CM4620-IE (a drug for pancreatic cancer); and Interleukin inhibitors (IL-6 inhibitors). The NIH currently believes there are insufficient data to recommend either for or against the use of Interleukin-1 inhibitors (e.g., anakinra) and Interleukin-6 inhibitors (e.g., sarilumab, siltuximab, tocilizumab) to treat COVID-19.

The U.S. FDA has also approved a device that filters cytokines out of the blood of subjects admitted to the intensive care unit (ICU) with confirmed or imminent respiratory failure. The FDA granted emergency use authorization to Terumo BCT Inc. and Marker Therapeutics AG for their Spectra Optia Apheresis System and Depuro D2000 Adsorption Cartridge devices.

Another treatment option includes immunomodulators (such as alpha and beta interferons and kinase inhibitors). The NIH also recommends, except in the context of a clinical trial, against the use of other immunomodulators, such as Interferons, because of the lack of efficacy in treatment of severe acute respiratory syndrome (SARS) and Middle East respiratory syndrome (MERS) and toxicity, and Janus kinase inhibitors (e.g., baricitinib) (AIII), because of their broad immunosuppressive effect.

For critically ill adult subjects with COVID-19 that require ventilator support, the NIH recommends high-flow nasal cannula (HFNC) oxygen over noninvasive positive pressure ventilation (NIPPV) for subjects with acute hypoxemic respiratory failure despite conventional oxygen therapy. For subjects who require a mechanical ventilator and also present with acute respiratory distress syndrome (ARDS), the NIH recommends using low tidal volume (Vt) ventilation (Vt 4-8 mL/kg of predicted body weight) over higher tidal volumes (Vt>8 mL/kg). For mechanically ventilated adults with COVID-19 and refractory hypoxemia despite optimized ventilation, the NIH recommends prone ventilation for 12 to 16 hours per day over no prone ventilation. For mechanically ventilated adults with COVID-19, severe ARDS, and hypoxemia despite optimized ventilation and other rescue strategies, the NIH recommends a trial of inhaled pulmonary vasodilator as a rescue therapy; if no rapid improvement in oxygenation is observed, it is recommended that the subject be tapered off treatment.

Another treatment option includes administering corticosteroids to a subject. However, the NIH also recommends against the routine use of systemic corticosteroids for the treatment of mechanically ventilated subjects with COVID-19 without ARDS. In mechanically ventilated adults with COVID-19 and ARDS, the NIH believes there are insufficient data to recommend either for or against corticosteroid therapy in the absence of another indication. However, In COVID-19 subjects with refractory shock, the NIH states that low-dose corticosteroid therapy is preferred over no corticosteroid therapy.

Another treatment option is Antithrombotic Therapy using anticoagulants and antiplatelet therapy. The NIH recommends that hospitalized adults with COVID-19 should receive venous thromboembolism (VTE) prophylaxis per the standard of care for other hospitalized adults. The NIH recommends that subjects with COVID-19 who experience an incident thromboembolic event or who are highly suspected to have thromboembolic disease at a time when imaging is not possible should be managed with therapeutic doses of anticoagulant therapy as per the standard of care for subjects without COVID-19, and that subjects with COVID-19 who require extracorporeal membrane oxygenation or continuous renal replacement therapy or who have thrombosis of catheters or extracorporeal filters should be treated with antithrombotic therapy per the standard institutional protocols for those without COVID-19.

Lastly, there are currently no approved vaccines for COVID-19. Current vaccine candidates include mRNA and DNA based vaccines, viral vector-based vaccines, inactivated (non-infectious) or weakened coronavirus (sometimes administered in a viral vector), and protein-based vaccines, including immunizing with a protein subunit of the virus or with a virus-like particle.

III. Network Environment for Hosting the Cloud-Based Application Configured With Intelligent Functionality FIG. 1 illustrates network environment 100, in which an embodiment of the cloud-based application is hosted. Network environment 100 may include cloud network 130, which includes cloud server 135 and data registry 140. Cloud server 135 may execute the source code underlying the cloud-based application. Data registry 140 may store the data records ingested from or identified using one or more user devices, such as computer 105, laptop 110, and mobile device 115.

The data records stored in data registry 140 may be structured according to a skeleton structure of fixed parts (e.g., data fields). Computer 105, laptop 110, and mobile device 115 may each be operated by various users. For example, computer 105 may be operated by a physician, laptop 110 may be operated by an administrator of an entity, and mobile device 115 may be operated by a subject. Mobile device 115 may connect to cloud network 130 using gateway 120 and network 125. In some examples, each of computer 105, laptop 110, and mobile device 115 are associated with the same entity (e.g., the same hospital). In other examples, computer 105, laptop 110, and mobile device are associated with different entities (e.g., different hospitals). The user devices of computer 105, laptop 110, and mobile device 115 are examples for the purpose of illustration, and thus, the present disclosure is not limited thereto. Network environment 100 may include any number or configuration of user devices of any device type.

In some embodiments, cloud server 135 may obtain data (e.g., subject records) for storing in data registry 140 by interacting with any of computer 105, laptop 110, or mobile device 115. For example, computer 105 interacts with cloud server 135 by using an interface to select subject records or other data records stored locally (e.g., stored in a network local to computer 105) for ingesting into data registry 140. As another example, computer 105 interacts with an interface to provide cloud server 135 with an address (e.g., a network location) of a database storing subject records or other data records. Cloud server 135 then retrieves the data records from the database and ingests the data records into data registry 140.

In some embodiments, computer 105, laptop 110, and mobile device 115 are associated with different entities (e.g., medical centers). The data records that cloud server 135 obtains from computer 105, laptop 110, and mobile device 115 may be stored in different data registries. While the data records from each of computer 105, laptop 110, and mobile device 115 may be stored within cloud network 130, the data records may not be intermingled. For example, computer 105 cannot access the data records obtained from laptop 110 due to the constraints imposed by data-privacy rules. However, cloud server 135 may be configured to automatically obfuscate, obscure, or mask portions of the data records when those data records are queried by a different entity. Thus, the data records ingested from an entity may be exposed to a different entity in an obfuscated, obscured, or masked form to comply with data-privacy rules. As an illustrative example, a physician or other medical professional can input a subject's symptoms, which potentially relate to COVID-19. The symptoms may be stored within cloud network 130 as part of the subject record associated with the subject.

Once the data records are collected from computer 105, laptop 110, and mobile device 115, the data records may be used as training data to train machine-learning or artificial-intelligence models to provide the intelligent analytical functionality described herein. The data records may also be available for querying by any entity, given that when a user device associated with an entity queries data registry 140 and the query results include data records originating from a different entity, those data records may be provided or exposed to the user device in an obfuscated form, which complies with data-privacy rules.

Cloud server 135 may be configured to execute intelligent functionality to process the data records stored in data registry 140. For example, executing intelligent functionality may include inputting at least a portion of the data records stored in data registry 140 into a trained machine-learning or artificial-intelligence models to generate outputs for further analysis. In some embodiments, the outputs can be used to extract patterns within the data records or to predict values or outcomes associated with data fields of the data records. Various embodiments of the intelligent functionality executed by cloud server 135 are described below.

In some embodiments, cloud server 135 is configured to enable a user device (e.g., operated by a doctor) to access the cloud-based application to transmit consult broadcasts to a set of destination devices. A consult broadcast may be a request for support or assistance regarding the treatment of a subject associated with a subject record. A destination device may be a user device operated by another user associated with another entity (e.g., a doctor at another medical center). If a destination device accepts the request for assistance associated with the consult broadcast, the cloud-based application may generate a condensed representation of the subject record that omits or obscures certain data fields of the subject record. The condensed representation may comply with data-privacy rules, and thus, the condensed representation of the subject record cannot be used to uniquely identify the subject associated by the subject record. The cloud-based application may transmit the condensed representation of the subject record to the destination device that accepted the request for assistance. The user operating the destination device may evaluate the condensed representation and communicate with the user device using a communication channel to discuss options for treating the subject. As an illustrative example, a physician may be treating a subject with a confirmed diagnosis of COVID-19. The physician may seek additional advance or consult on how to treat the COVID-19 subject. The physician can cause a broadcast consult to be transmitted to physicians working at different hospitals. The various subject attributes of the subject record can be obfuscated and then transmitted to the other physician. The two physicians can then communicate regarding the obfuscated COVID-19 record during a communication session, such as a chatroom.

In some embodiments, cloud server 135 is configured to provide a treatment-plan definition interface to user devices. The treatment-plan definition interface enables user devices to define a treatment plan for a condition. For example, a treatment plan may be a workflow for treating a subject with the condition. A workflow may include one or more criteria for defining a population of subjects as having the condition. The workflow may also include a particular type of treatment for the condition. The cloud server 135 receives and stores treatment-plan definitions for a particular condition from each user device of a set of user devices. The cloud-based application may distribute a treatment plan for a given condition to a set of user devices. Two or more user devices of the set of user devices may be associated with different entities. Each of the two or more users devices may be provided with the option to integrate any portion or the entire treatment plan into a customer rule set. Cloud server 135 can monitor whether user devices integrate the shared treatment plan in full or integrate part of the treatment plan. The interactions between the user devices and the shared treatment plan can be used to determine whether to update the treatment plan or a rule created based on the treatment plan.

In some embodiments, cloud server 135 enables a user operating a user device to access the cloud-based application to determine a proposed treatment for a subject with a condition. The user device loads an interface associated with the cloud-based application. The interface enables the user operating the user device to select a subject record associated with a subject being treated by the user. The cloud-based application may evaluate other subject records to identify a previously-treated subject who is similar to the subject being treated by the user. The similarity between subjects, for example, may be determined using an array representation of the subject records. An array representation may be any numerical and/or categorical representation of the values of data fields of a subject record. For example, an array representation of a subject record may be a vector representation of the subject record in a domain space, such as in a Euclidean space. In some instances, multiple values in an array correspond to a single field. For example, a field value may be represented by multiple binary values generated via one-hot encoding. The cloud-based application may generate array representations for each subject record of a group of subject records. Similarity between two subject records may be represented by a distance between the array representations of the two subject records. Further, the cloud-based application may be configured to identify a subject who is a nearest neighbor to the subject record selected by the user device using the interface. The cloud-based application may identify treatments previously performed on the subject who is the nearest neighbor. The cloud-based application may avail on the interface the previously-performed treatments on the nearest neighbor for evaluation by the user operating the user device.

In some embodiments, cloud server 135 is configured to create queries that search a database of previously-treated subjects. Cloud server 135 may execute the queries and retrieve subject records that satisfy the constraints of the query. In presenting the query results, however, the cloud-based application may only present the subject record in full for subjects who have been or who are being treated by the user who created the query. The cloud-based application masks or otherwise obfuscates portions of subject records for subjects who are not being treated by the user creating the query. The masking or obfuscation of portions of subject records that are included in the query results enables the user to comply with data-privacy rules. In some embodiments, the query results (regardless of whether the query results are obfuscated or not) can be automatically evaluated for patterns or common attributes within the subject records.

In some embodiments, cloud server 135 embeds a chatbot into the cloud-based application. The chatbot is configured to automatically communicate with user devices. The chatbot can communicate with a user device in a communication session, in which messages are exchanged between the user device and the chatbot. A chatbot may be configured to select answers to questions received from user devices. The chatbot may select answers from a knowledge base accessible to the cloud-based application. When a user device transmits a question to the chatbot, and that chatbot does not have a preexisting answer stored in the knowledge base, then a different representation of the question for which there is a preexisting answer stored in the knowledge base. The user communicating with the chatbot can be prompted as to whether the answer provided by the chatbot is accurate or helpful.

Figure 2:
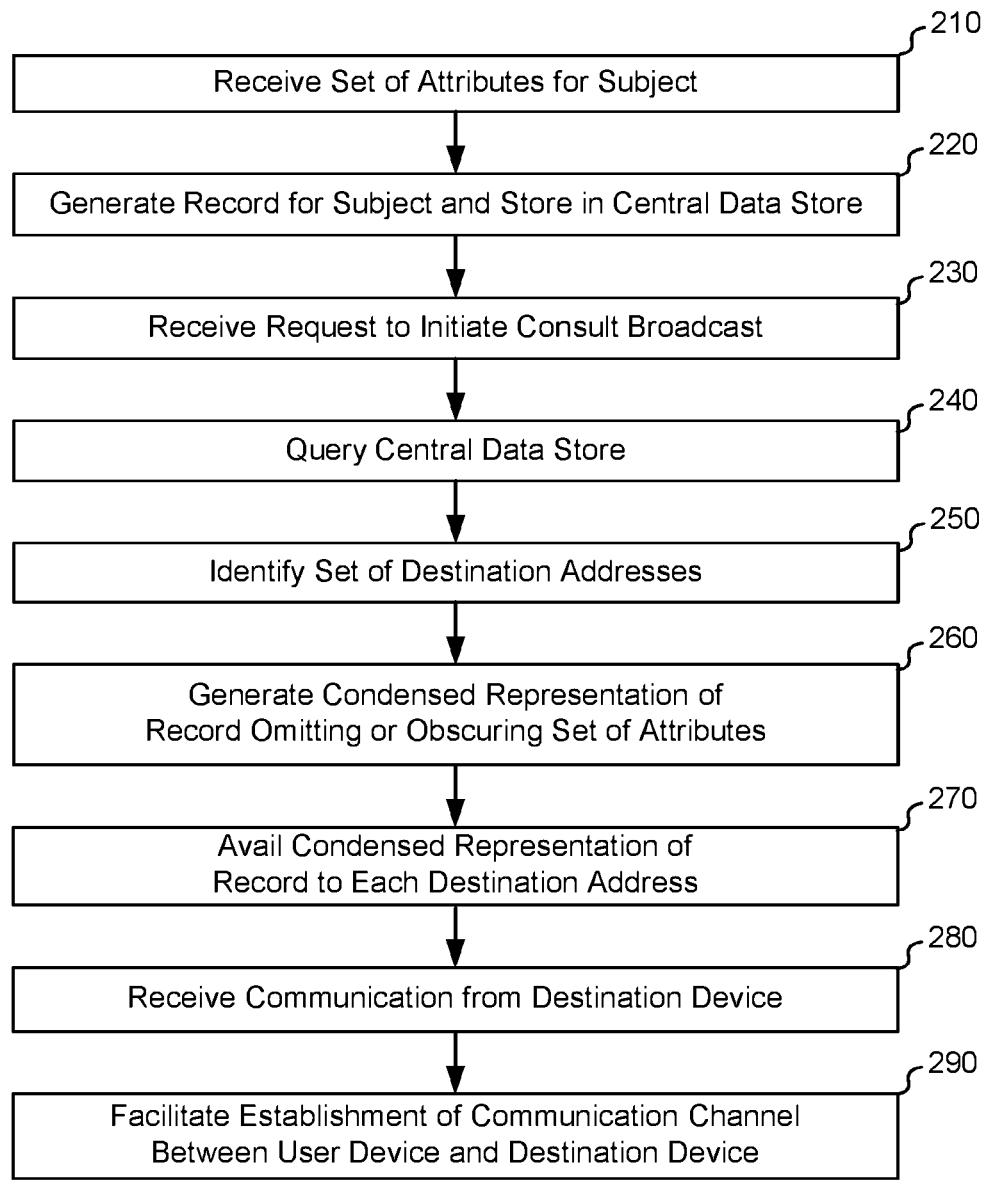
FIG. 2 is a flowchart illustrating an example of a process performed by the cloud-based application to distribute condensed subject records to user devices in association with a consult broadcast requesting assistance with treating a subject, according to some aspects of the present disclosure.

III.A. The Cloud-Based Application Enables User Devices To Broadcast Consult Requests to Other User Devices and Automatically Condenses Subject Records to Comply with Data-Privacy Rules FIG. 2 is a flowchart illustrating process 200 performed by the cloud-based application to distribute condensed subject records to user devices in association with a consult broadcast requesting assistance with treating a subject. Process 200 may be performed by cloud server 135 to enable user devices associated with different entities (e.g., hospitals) to collaborate or consult regarding treatment for a subject, while complying with data-privacy rules.

Process 200 begins at block 210 where cloud server 135 receives a set of attributes from a user device. Each attribute of the set of attributes can represent any characteristic(s) of a subject (e.g., a patient). The set of attributes may be identified by a user using an interface provided by cloud server 135. For example, the set of attributes identify demographic information of the subject and a recent symptom experienced by the subject. Non-limiting examples of demographic information include age, sex, ethnicity, state or city of residence, income range, education level, or any other suitable information. Non-limiting examples of a recent symptom include a subject currently or recently (e.g., at a last visit, at intake, within 24 hours, within a week) experienced a particular symptom (e.g., difficulty breathing, fever above a threshold temperature, blood pressures above a threshold blood pressure, etc.).

At block 220, cloud server 135 generates a record for the subject. The record may be a data element including one or more data fields. The record indicates each of the set of attributes associated with the subject. The record may be stored at a central data store, such as data registry 140 or any other cloud-based database. At block 230, cloud server 135 receives a request, which was submitted by a user using the interface. The request may be to initiate a consult broadcast. For example, the user associated with an entity is a physician at a medical center treating a subject. The user can operate a user device to access the cloud-based application to broadcast a request for assistance with treating the subject. The broadcast may be transmitted to a set of other user devices associated with a different entity.

At block 240, cloud server 135 queries the central data store using the one or more recent symptoms included in the set of attributes associated with a subject. The query results include a set of other records. Each record of the set of other records is associated with another subject. At block 250, cloud server 135 identifies a set of destination addresses (e.g., other user devices associated with a different entity). Each destination address of the set of destination address is associated with a care provider for another subject associated with one or more other records of the set of other records identified at block 240. At block 260, cloud server 135 generates a condensed representation of the record for the subject. The condensed representation of the record omits, obscures, or obfuscates at least a portion of the record. The condensed representation of the record can be exchanged between external systems without violating data-privacy rules because the condensed representation of the record cannot be used to uniquely identify the subject associated with the record. Cloud server 135 can execute any masking or obfuscation techniques to generate the condensed representation of the record.

At block 270, cloud server 135 avails the condensed representation of the record with a connection input component to each destination address of the set of destination addresses. The connection input component may be a selectable element presented to each destination address. Non-limiting examples of the connection input component include a button, a link, an input element, and other suitable selectable elements. At block 280, cloud server 135 receives a communication from a destination device associated with a destination address. The communication includes an indication that the user operating the destination device selected the connection input component associated with the condensed representation of the record. At block 290, cloud server 135 facilitates the establishment of a communication channel between the user device and the destination device at which the connection input component was selected. The communication channel enables the user operating the user device (e.g., the physician treating the subject) to exchange messages or other data (e.g., a video feed) with the destination device associated with the destination address at which the connection input component was selected (e.g., a physician at another hospital who agreed to assist with the treatment of the subject).

In some embodiments, cloud server 135 is configured to automatically determine a location of the user device and a location of the destination device at which the connection input component was selected. Cloud server 135 can also compare the locations to determine whether to generate the condensed representation of the record. For example, at block 260, cloud server 135 may generate the condensed representation of the record because cloud server 135 determines that each destination address of the set of destination addresses is not collocated with the user device that initiated the consult broadcast. In this case, cloud server 135 may automatically determine to generate the condensed representation of the record to comply with data-privacy rules. As another example, if the set of destination addresses is associated with the same entity as the user device that initiated the consult broadcast, then cloud server 135 can transmit the record in full (e.g., without obfuscating a portion of the record) to a destination device associated with a destination address, while still complying with the data-privacy rules.

In some embodiments, cloud server 135 generates a plurality of other condensed record representations. Each of the plurality of other condensed record representations is associated with another subject. Cloud server 135 transmits the plurality of other condensed record representations to the user device; and receives, from the user device, a communication identifying selections of a subset of the plurality of other condensed record representations. Each of the set of destination addresses is represented by one of the condensed record representations. For example, generating a condensed record representation includes determining a jurisdiction of another subject associated with the condensed record representation, determining a data-privacy rule governing the exchange of subject records within the jurisdiction, and generated the condensed record representation to comply with the data-privacy rule. A first other condensed record representation of the plurality of other condensed record representations may include data of a particular type. A second other condensed record representation of the plurality of other condensed record representations may omit or obscure data of the particular type. For example, data of the particular type may be contact information, identifying information, such as name, social security number, and other suitable information that can be used to uniquely identify the other subject.

In some embodiments, querying the central data store using the one or more recent symptoms includes determining a score for each other record of a plurality of other records. The score can characterize a similarity between at least part of the other record and at least part of the record for the subject. The querying can further include defining the set of other records to be a subset of the plurality of other records associated for which the scores are above a threshold. The querying of the central data store can include using at least some of the demographic information to identify the set of other records. For example, one of the other records can include a data field containing an item of demographic information, such as age, sex, ethnicity, and so on. In some embodiments, the user device and the other device (e.g., the destination device associated with the destination address) are associated with different medical-care institutions.

Figure 3:
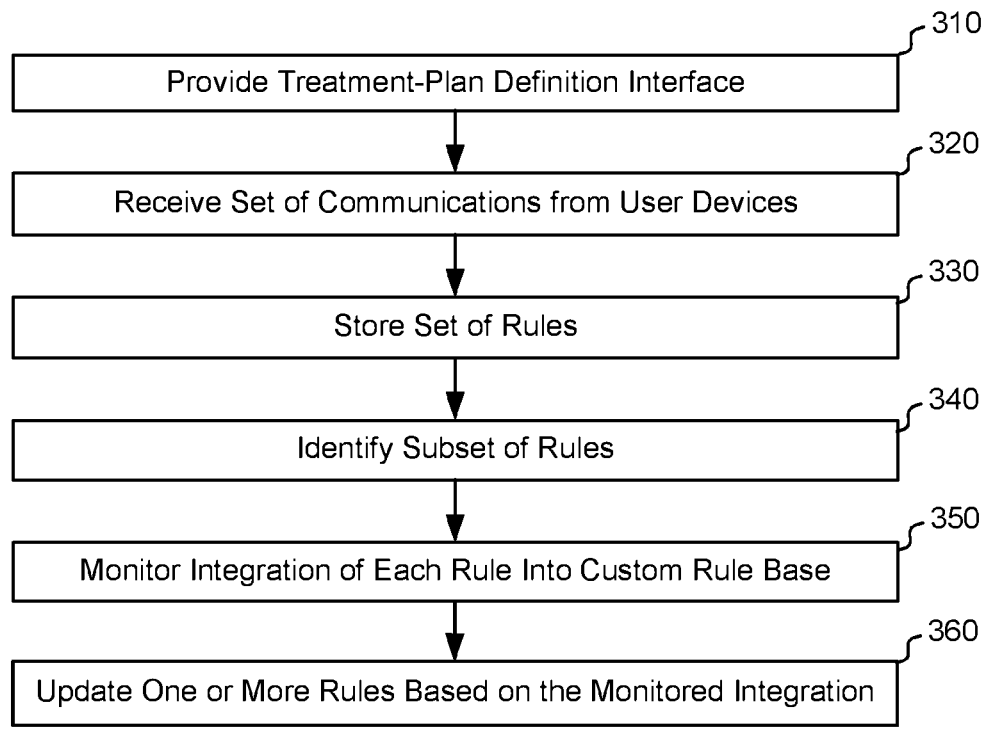
FIG. 3 is a flowchart illustrating an example of a process for monitoring the user integration of treatment-plan definitions (e.g., decision trees or treatment workflows) and automatically updating the treatment-plan definitions based on a result of the monitoring, according to some aspects of the present disclosure.

III.B. Updating Shareable Treatment-Plan Definitions Based on Aggregated User Integration FIG. 3 is a flowchart illustrating process 300 for monitoring the user integration of treatment-plan definitions (e.g., decision trees or treatment workflows) and automatically updating the treatment-plan definitions based on a result of the monitoring. Process 300 may be performed by cloud server 135 to enable a user device to define a treatment plan for treating a population of subjects with a condition. The user device may distribute the treatment-plan definition to user devices connected to internal or external networks. The user devices receiving the treatment-plan definition can determine whether to integrate the treatment-plan definition into a custom rule base. The integration into the custom rule base can be monitored and used to automatically modify the treatment-plan definition.

At block 310, cloud server 135 stores interface data that causes a treatment-plan definition interface to be displayed when a user device loads the interface data. The treatment-plan definition interface is provided to each user device of a set of user devices when the user devices accesses cloud server 135 to navigate to the treatment-plan definition interface. In some embodiments, the treatment-plan definition interface enables a user to define a treatment plan for treating a population of subjects that have a condition (e.g., lymphoma).

At block 320, cloud server 135 receives a set of communications. Each communication of the set of communications is received from a user device of the set of user devices and was generated in response to an interaction between the user device and the treatment-plan definition interface. In some embodiments, the communication includes one or more criteria, for example, for defining a population of subject records. Each criteria may be represented by a variable type. A criterion may be a filter condition for filtering a pool of subject records. For example, a criteria for defining a population of subject records associated with subjects who may develop a lymphoma may include a filter condition of "abnormality in anaplastic lymphoma kinase (ALK)" AND "over 60 years old." The communication may also include a particular type of treatment for the condition. The particular type of treatment may be associated with an action (e.g., undergo surgery) or non-action (e.g., reduce salt intake) that is proposed to treat the condition associated with the subjects represented by the population of subject records.

At block 330, cloud server 135 stores a set of rules in a central data store, such as data registry 140 or any other centralized server within cloud network 130. Each rule of the set of rules includes the one or more criteria and the particular treatment type included in the communication from a user device. As an illustrative example, a rule represents a treatment workflow for treating lymphoma in a subject. The rule includes the following criteria (e.g., the conditions following the "IF" statement) and a next action (e.g., the particular treatment type defined or selected by the user, and which follow the "THEN" statement): "IF 'biopsy of lymph nodes indicates lymphoma cells are present' AND 'blood test reveals lymphoma cells present' THEN 'treat with chemotherapy' AND 'active surveillance.'" Additionally, each rule of the set of rules is stored in association with an identifier corresponding to the user device from which the communication was received.

At block 340, cloud server 135 identifies a subset of the set of rules that are available across entities via the treatment-plan definition interface. A subset of rules may include the subset of the set of rules associated with a condition and that are distributed to external systems, such as other medical centers, for evaluation. For example, a rule can be selected for including in the subset of rules by evaluating a characteristic of the rule or the identifier associated with the rule. The characteristic of the rule can include a code or flag stored or appended to the stored rule. The code or flag indicates the rule is generally available to external systems (e.g., availed to entities).

At block 350, for each rule of the subset of rules identified at block 340, cloud server 135 monitors interactions with the rule. An interaction may include an external entity (e.g., external to the entity associated with the user who defined the treatment plan associated with the rule) integrating the rule into a custom rule base. For example, a user device associated with an external entity (e.g., a different hospital) evaluates the rule availed to the external entity. The evaluation includes determining whether the rule is suitable for integrating into a rule set defined by the external entity. The rule may be suitable when the user device associated with the external entity indicates that the treatment workflow that is defined using the rule is suitable to treat the condition corresponding to the rule. Continuing with the illustrative example above, the rule for treating lymphoma may be availed to an external medical center. A user associated with the external medical center determines that the rule for treating lymphoma is suitable for integrating into the rule set defined by the external medical center. Thus, after the rule is integrated into a custom rule base defined by the external medical center, other users associated with the external medical center will be able to execute the integrated rule by selecting the integrated rule from the custom rule base. Additionally, cloud server 135 monitors integration of the availed rule by detecting a signal generated or caused to be generated when the treatment-plan definition interface receives input corresponding to an integration of the rule into the custom rule base from the user device associated with the external entity.

As another illustrative example, the user device associated with the external entity uses the treatment-plan definition to integrate an interaction-specified modified version of the rule into the custom rule base. The interaction-specified modified version of the rule is a portion of the rule selected for integration into the custom rule base. Selecting a portion of the rule for integration includes selecting less than all criteria included in the rule for integration into the custom rule base. Continuing with the illustrative example above, the user device associated with the external entity selects the criteria of "IF 'biopsy of lymph nodes indicates lymphoma cells are present'" for integration into the custom rule base, but the user device does not select the criteria of "blood test reveals lymphoma cells present" for integration into the custom rule base. Thus, the interaction-specific modified version of the rule integrated into the custom rule base is "IF 'biopsy of lymph nodes indicates lymphoma cells are present'THEN 'treat with chemotherapy' AND 'active surveillance.'" The criteria of "blood test reveals lymphoma cells present" is removed from the rule to create the interaction-specified modified version of the rule, which is integrated into the custom rule base.

At block 360, cloud server 135 may detect that the interaction-specified modified version of the rule was integrated into the custom rule base defined by the external entity. Once detected, cloud server 135 may update the rule stored at the central data store of cloud network 130. The rule may be updated based on the monitored interaction(s). The term "based on" in this example corresponds to "after evaluating" or "using a result of an evaluation of" the monitored interaction(s). For example, cloud server 135 detects that the user device associated with the external entity integrated the interaction-specified modified version of the rule. In response to detecting the interaction-specified modified version of the rule, cloud server 135 may update the rule stored in the central data store from the existing rule to the interaction-specified modified version of the rule.

In some embodiments, cloud server 135 updates the rule by generating an updated version that is to be availed across external entities. Another original version may remain un-updated and is availed to a user associated with the user device from which the one or more communications that identified the criteria and particular type of treatment was received. For example, cloud server 135 updates the rule stored at the central data store, but cloud server 135 does not update another rule of the set of rules stored at the central data store.

In some embodiments, cloud server 135 may update the rule when an update condition has been satisfied. An update condition may be a threshold value. For example, the threshold value may be a number or percentage of external entities that have integrated a modified version of the rule into their custom rule bases. As another example, the update condition may be determined using an output of a trained machine-learning model. To illustrate, cloud server 135 may input the detected signals received from external entities into a multi-armed bandit model that automatically determines whether and when to avail the rule and/or whether and when to avail an updated version of the rule. The detected signals indicate whether an external entity integrated the rule into its custom rule base or whether the external entity integrated an interaction-specified modified version of the rule.

In some embodiments, cloud server 135 identifies multiple rules of the set of rules that include criteria corresponding to the same variable type and that identify same or similar types of treatment. A variable type may be a value or variable used as the condition of a criteria. The variable type of a criterion of a rule may also be any value of a condition that constrains the population of subjects to a sub-group. For example, the variable type of a rule that defines a population of pregnant women is "IF 'subject is pregnant.'" Cloud server 135 determines a new rule that is a condensed representation of the multiple rules, when the new rule is generally availed across entities.

In some embodiments, cloud server 135 provides another interface configured to receive a set of attributes of a subject. For example, a user operating a user device to access the other interface and select a subject record that includes a set of attributes using the other interface. The selection of the subject record may cause the cloud server 135 to receive the set of attributes of the subject. Cloud server 135 identifies (e.g., determines) a particular rule for which the criteria are satisfied based on the set of attributes of the subject. For example, the evaluates the set of attributes of the subject record against the criteria of the rules stored in the central data store. To illustrate, if the set of attributes includes a data field containing the value "pregnant," and if a rule includes a single criteria of "IF 'subject is pregnant," then cloud server 135 identifies this rule. Cloud server 135 updates the other interface to present the particular rule and each particular type of treatment associated with the particular rule.

In some embodiments, a criterion of a rule is a variable type that relates to a particular demographic variable and/or a particular symptom-type variable. Non-limiting examples of a demographic variable include any item of information that characterizes a demographic of the subject, such as age, sex, ethnicity, race, income level, education level, location, and other suitable items of demographic information. Non-limiting examples of a symptom-type variable indicate whether a subject currently or recently (e.g., at a last visit, at intake, within 24 hours, within a week) experienced a particular symptom (e.g., difficulty breathing, fainting, fever above a threshold temperature, blood pressures above a threshold blood pressure, etc.).

In some embodiments, cloud server 135 monitors data in a registry of subject records, such as the subject records stored in data registry 140. Cloud server 135 monitors the data in the registry of subject records for each rule of the subset of rules (identified at block 340). Cloud server 135 identifies a set of subjects for which the criteria of the rule were satisfied, and for which the particular treatment was previously prescribed to the subject. Cloud server 135 identifies, for each of the set of subjects, a reported state of the subject as indicated from or using assessment or testing. For example, the reported state is any information characterizing a state of the subject in an aspect, such as whether the subject has been discharged, whether the subject is alive, measurements of the subject's blood pressure, the number of times the subject wakes up during a sleep stage, and other suitable states. Cloud server 135 determines an estimated responsiveness metric of the set of subjects to the particular treatment based on the reported states. For example, if the particular treatment of a rule is to prescribe a medication, the estimated responsiveness metric is a representation of the extent to which the medication addressed a symptom or condition experienced by the subject. As a non-limiting example, the estimated responsiveness metric of the set of subjects may be an average, weighted average, or any summation of a score assigned to each subject of the set of subjects. The score can represent or measure the effectiveness of the subject's responsiveness to the treatment. Cloud server 135 can cause the subset of the set of rules and the estimated responsiveness metrics of the set of subjects to be displayed or otherwise presented in the treatment-plan definition interface.

Figure 4:
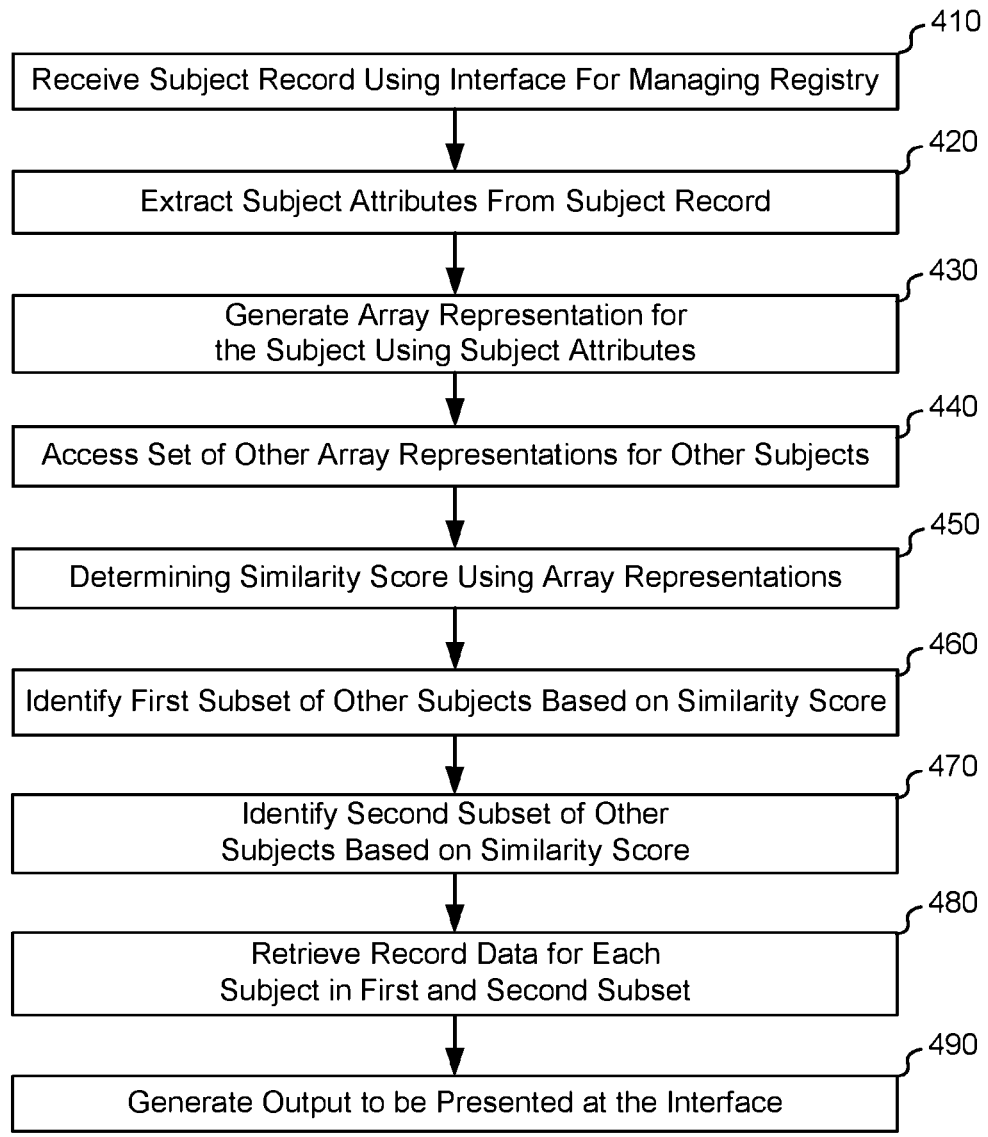
FIG. 4 is a flowchart illustrating an example of a process for recommending treatments for a subject, according to some aspects of the present disclosure.

III.C. Presenting Treatment Recommendations With Associated Efficacy Using Treatments Prescribed to Similar Subjects FIG. 4 is a flowchart illustrating process 400 for recommending treatments for a subject. Process 400 can be performed by cloud server 135 to display to a user device associated with a medical entity recommended treatments for a subject and the efficacy of each recommended treatment. The recommended treatments can be identified using a result of evaluating efficacies of treatments previously prescribed to similar subjects.

At block 410, cloud server 135 receives input corresponding to a subject record that characterizes aspects of a subject. The input is received from a user device associated with an entity. Further, the input is received in response to the user device selecting or otherwise identifying the subject record using an interface associated with an instance of a platform configured to manage a registry of subject records. User devices may access the interface by loading interface data stored at a web server (not shown) connected within cloud network 130. The web server may be included or executed on cloud server 135.

At block 420, cloud server 135 extracts a set of subject attributes from the subject record received at block 410. A subject attribute characterizes an aspect of the subject. Non-limiting examples of subject attributes include any information found in an electronic health record, any demographic information, an age, a sex, an ethnicity, a recent or historical symptom, a condition, a severity of the condition, and any other suitable information that characterizes the subject.

At block 430, cloud server 135 generates an array representation of the subject record using the set of subject attributes. For example, the array representation is a vector representation of the values included in the subject record. The vector representation may be a vector in a domain space, such as a Euclidean space. The array representation, however, can be any numerical representation of a value of a data field of the subject record. In some embodiments, cloud server 135 can perform feature decomposition techniques, such as singular value decomposition (SVD), to generate the values representing the set of subject attributes of the array representation of the subject record.

At block 440, cloud server 135 accesses a set of other array representations characterizing multiple other subjects. An array representation included in the set of other array representations may be a vector representation of a subject record that characterizes another subject (e.g., one of the multiple other subjects).

At block 450, cloud server 135 determines a similarity score representing a similarity between the array representation representing the subject and the array representation of each of the other subjects. For example, the similarity score is calculated using a function of a distance (in the domain space) between the array representation representing the subject and the array representation representing the other subject. To illustrate and as only a non-limiting example, the similarity score may be calculated using a range of "0" to "1," with "0" representing a distance beyond a defined threshold and "1" representing that the array representations have no distance between them.

At block 460, cloud server 135 identifies a first subset of the multiple other subjects. Subjects may be included in the first subset when the similarity score associated with a subject is above a predetermined absolute or relative threshold. Similarly, at block 470, cloud server identifies a second subset of the multiple other subjects. However, subjects may be included in the second subset when the similarity score of this subject is within a predetermine range.

At block 480, cloud server 135 retrieves record data for each subject in the first subset and in the second subset of the multiple other subjects. The record data include the attributes that are included in a record characterizing a subject. For example, the record data identifies a treatment received by the subject and the subject's responsiveness to the treatment. The responsiveness to the treatment may be represented by text (e.g., "subject responded positively to treatment") or a score indicating an extent to which the subject responded positively or negatively to the treatment (e.g., a score from "0" to "1" with "0" indicating a negative responsiveness and "1" indicating a positive responsiveness).

At block 490, cloud server 135 generates an output to be presented at the interface on the user device. The output may indicate, for example, the treatments received by the other subjects in the first and second subsets, the treatment responsiveness of subjects in the first and second subsets, and the differences between the subject attributes of subjects in the second subset and subject attributes of the subject.

In some embodiments, cloud server 135 determines that the subject and one of the subjects from the first or second subset are being treated or were treated by the same medical entities. Cloud server 135 determines that the subject and another subject of the first or second subset are being treated or were treated by different medical entities. Cloud server 135 may avail differentially obfuscated versions of records of the subjects via the interface. As a technical advantage, the cloud-based application can automatically provide differently obfuscated versions of records to entities based on varying constraints imposed on data sharing by the data-privacy rules of different jurisdictions. In some embodiments, cloud server 135 identifies the first subset and the second subset using a nearest-neighbor learning technique.

III.D. Automatically Obfuscating Query Results From External Entities

Figure 5:
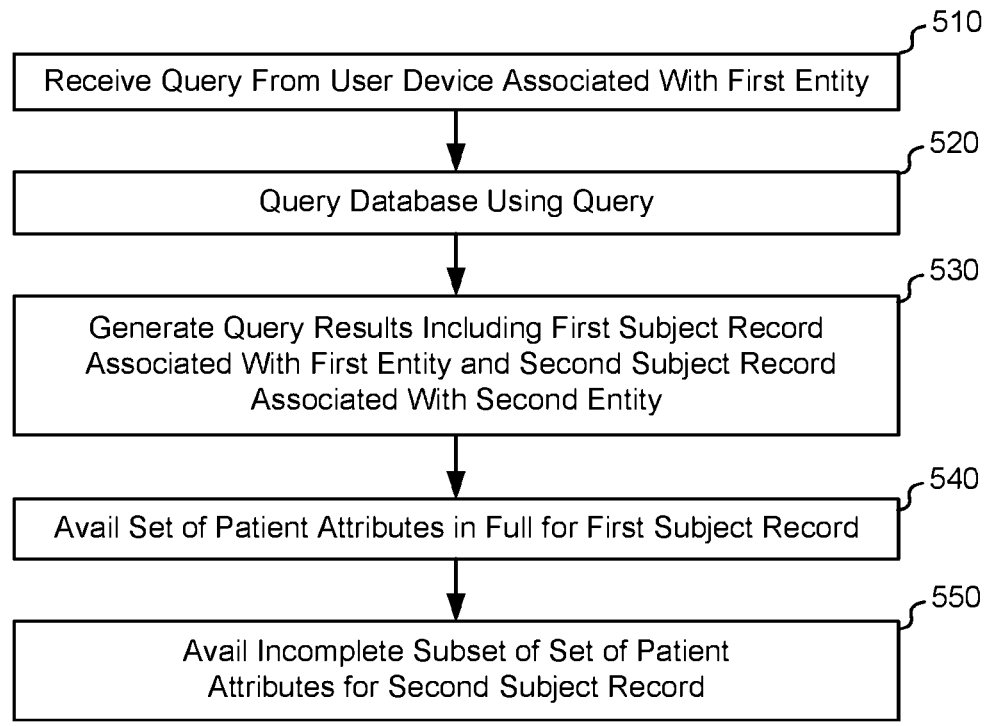
FIG. 5 is a flowchart illustrating an example of a process for obfuscating query results to comply with data-privacy rules, according to some aspects of the present disclosure.

FIG. 5 is a flowchart illustrating process 500 for obfuscating query results to comply with data-privacy rules. Process 500 may be performed by cloud server 135 as an executing rule that ensures data sharing of subject records with external entities complies with data-privacy rules. The cloud-based application may enable a user device to query data registry 140 for subject records that satisfy a query constraint. The query results, however, may include data records originating from external entities. Thus, process 500 enables cloud server 135 to provide user devices with additional information on treatments from external entities, while complying with data-privacy rules.

At block 510, cloud server 135 receives a query from a user device associated with a first entity. For example, the first entity is a medical center associated with a first set of subject records. The query may include a set of symptoms associated with a medical condition or any other information constraining a query search of data registry 140.

At block 520, cloud server 135 queries a database using the query received from the user device. At block 530, cloud server 135 generates a data set of query results that correspond to the set of symptoms and are associated with the medical conditions. For example, the user device transmits a query for subject records of subjects who have been diagnosed with lymphoma. The query results include at least one subject record from the first set of subject records (which originate or were created at the first entity) and at least one subject record from a second set of subject records associated with a second entity (e.g., a medical center different from the first entity). Each of the subject record from the first set of subject records and the subject record from the second set of subject records may include a set of subject attributes. A subject attribute can characterize any aspect of a subject.

At block 540, cloud server 135 presents (e.g., avails or otherwise makes available) to the user device the set of subject attributes in full for subject records included in the first set of subject records because these records originate from the first entity. Presenting a subject record in full includes making the set of attributes included in a subject record available to the user device for evaluation or interaction using the interface. At block 550, cloud server 135 also or alternatively avails to the user device an incomplete subset of the set of subject attributes for each subject record included in the second set of subject records. Providing an incomplete subset of the set of subject attribute provides anonymity to subjects because the incomplete subset of subject attributes cannot be used to uniquely identify a subject. For example, providing an incomplete subset may include available four of 10 subject attributes to anonymize the subject associated with the 10 subject attributes. In some embodiments, at block 550, cloud server 135 avails an obfuscated set of subject attributes for each subject record included in the second subject. Obfuscating the set of attributes include reducing the granularity of information provided. For example, instead of availing the subject attribute of a subject's address, the obfuscated attribute may be a zip code or a state in which the subject lives. Whether an incomplete subject or an obfuscated subset is availed, cloud server 135 anonymizes a subject associated with the subject record.

III.E. Chatbot Integration with Self-Learning Knowledge Base

Figure 6:
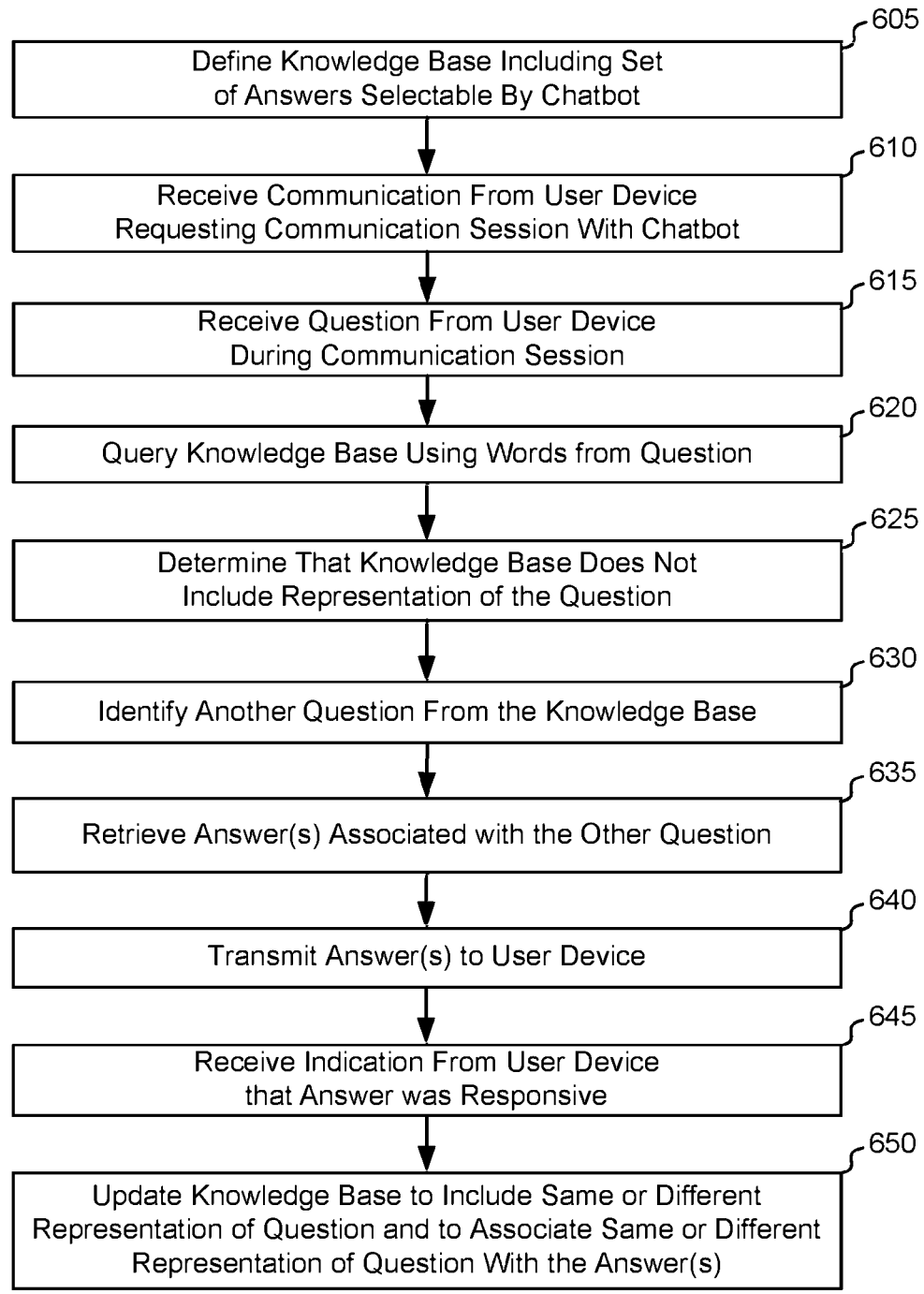
FIG. 6 is a flowchart illustrating an example of a process for communicating with users using bot scripts, such as a chatbot, according to some aspects of the present disclosure.

FIG. 6 is a flowchart illustrating process 600 for communicating with users using bot scripts, such as a chatbot. Process 600 may be performed by cloud server 135 for automatically linking new questions provided by users to existing questions in a knowledge base to provide a response to the new question. A chatbot may be configured to provide answers to questions associated with a condition.

At block 605, cloud server 135 defines a knowledge base, which includes a set of answers. The knowledge base may be a data structure stored in memory. The data structure stores text representing the set of answers to defined questions. Each answer may be selectable by a chatbot in response to a question received from a user device during a communication session. The knowledge base may be automatically defined (e.g., by retrieving text from a data source and parsing through the text using natural language processing techniques) or user defined (e.g., by a researcher or physician).

At block 610, cloud server 135 receives a communication from a particular user device. The communication corresponds to a request to initiate a communication session with a particular chatbot. For example, a physician or subject may operate a user device to communicate with a chatbot in a chat session. Cloud server 135 (or a module stored within cloud server 135) may manage or facilitate the establishment of communication sessions between user devices and chatbots. At block 615, cloud server 135 receives a particular question from the particular user device during the communication session. The question can be a string of text that is processed using natural language processing techniques.

At block 620, cloud server 135 queries the knowledge base using at least some words extracted from the particular question. The words may be extracted from the string of text representing the particular question using natural language processing techniques. At block 625, cloud server 135 determines that the knowledge base does not include a representation of the particular question. In this case, the question received may be newly posed to a chatbot. At block 630, cloud server 135 identifies another question representation from the knowledge base. Cloud server 135 may identify another question representation by comparing the question received from the user device to the other question representations stored in the knowledge base. If a similarity is determined, for example, based on an analysis of the question representations using natural language processing techniques, then cloud server 135 identifies the other question representation.

At block 635, cloud server 135 retrieves an answer of the set of answers associated, in the knowledge base, with the other question representation. At block 640, the answer retrieved at block 635 is transmitted to the particular user device as an answer to the question received, even though the knowledge based did not include a representation of the question received. At block 645, cloud server 135 receives an indication from the particular user device. For example, the indication may be received in response to the user device indicating that the answer provided by the chatbot was responsive to the particular question.

At block 650, cloud server 135 updates the knowledge base to include the representation of the particular question or different representation of the particular question. For example, storing a representation of a question includes storing keywords included in the question in a data structure. Cloud server 135 may also associate the same or different representation of the particular question with the more answer transmitted to the particular user device.

In some embodiments, cloud server 135 accesses a subject record associated with the particular user device. Cloud server 135 determines a plurality of answers to the particular question. Cloud server 135 then selects an answer from the set of answers. The selection of the answer, however, is based at least in part on one or more values included in the subject record associated with the particular user device. For example, a value included in the subject recode may represent a symptom recently experienced by the subject. The chatbot may select an answer that is dependent on the symptom recently experienced by the subject.

III.F. Module for Diagnosing Subjects With COVID-19

Figure 7:
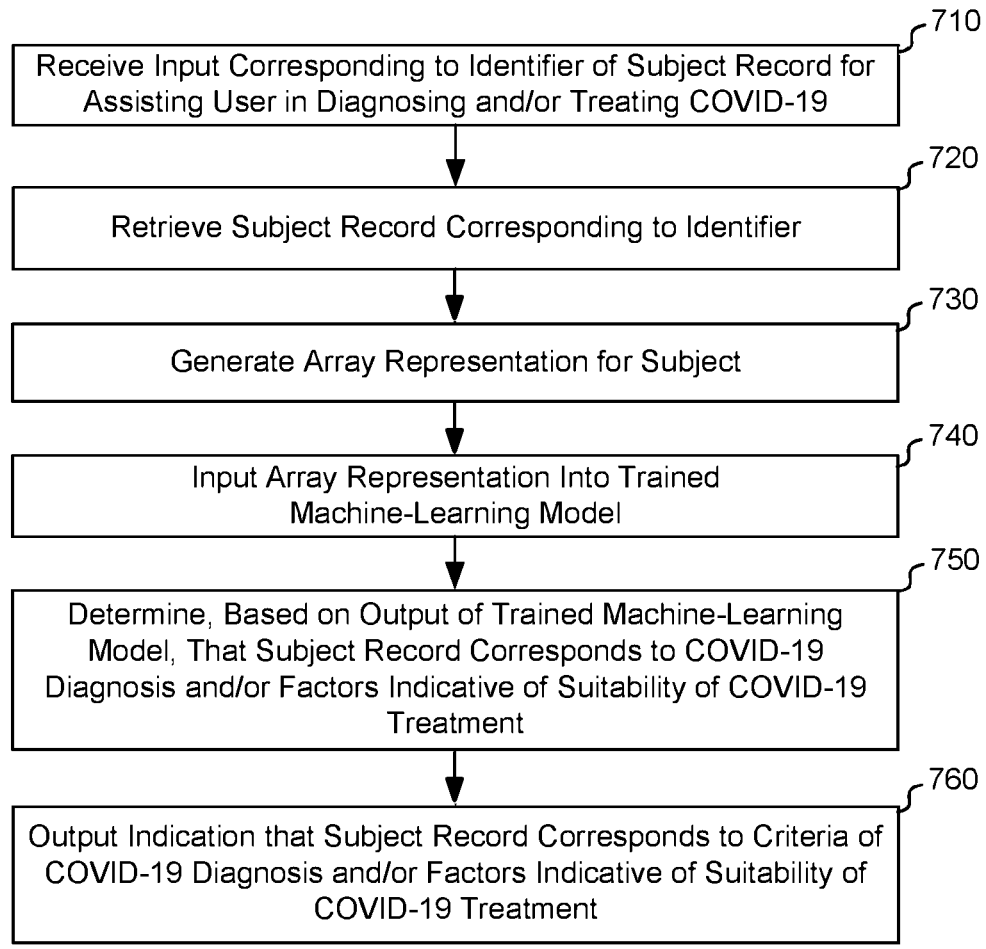
FIG. 7 is a flowchart illustrating an example of a process for diagnosing subjects with COVID-19, according to some aspects of the present disclosure.

FIG. 7 is a flowchart illustrating an example of process 700 for using a cloud-based application, according to certain embodiments, for diagnosing a subject with COVID-19 and/or for determining a set of proposed treatments for treating the subject. Process 700 can be performed by cloud server 135. For example, cloud server 135 can store interface data, which, when loaded onto a user device, causes an interface to be displayed on the user device. The interface may be configured to receive input data from a user (e.g., physician) relating to a subject being treated. The input data can be transmitted to cloud server 135 using the interface. For example, the input data may include any COVID-19-related symptoms that the subject is experience, such as the subject's comorbidities, fever, cough, shortness of breath (dyspnea), muscular soreness, chills, sore throat, and a new loss of taste or smell. Less common symptoms include gastrointestinal symptoms like nausea, vomiting, or diarrhea.

Cloud server 135 may process the input data and generate output(s) indicating that a subject corresponds to criteria of a COVID-19 diagnosis and/or factors indicative of suitability of a particular COVID-19 treatment. Additionally, a module for diagnosing and treating COVID-19 in subjects can be integrated into the cloud-based application. For example, the module may include executable code stored at cloud server 135. The module may include one or more rules or processes for diagnosing or treating COVID-19 that can be executed by cloud server 135 as part of the cloud-based application provided to users.

Process 700 begins at block 710 where cloud server 135 receives input corresponding to an identifier of a subject record. For example, the input is received from an interface that enables user devices to select subject record(s) for further evaluation. A physician operating a user device can load the interface, and then use the interface to select the identifier of the subject record. The identifier may be a code or any information that uniquely identifies the subject record. Non-limiting examples of the identifier include subject's name, contact information, identifier associated with the subject (e.g., initially assigned using a randomized, pseudo-randomized or sequential process), and other suitable identifying information. The user device may select the identifier of the subject record to cause cloud server 135 to generate a prediction of whether information in the subject record is consistent with characteristics of and/or a diagnosis with COVID-19.

At block 720, cloud server 135 receives the identifier of the subject record and retrieves the subject record from a data store. The subject record includes a set of subject attributes that characterize a subject. A subject attribute can be a value of a particular data field in the subject record that contains any information, such as health information, that describes the subject. Non-limiting examples of subject attributes include name, age, gender, height, weight, Body Mass Index (BMI), blood pressure and other vital statistics, address, previous medical history, previous diagnoses or conditions, a severity of a diagnosis (e.g., of COVID-19 or another condition), a severity of an existing medical condition (e.g., COVID-19 or another condition), whether the subject is a smoker, whether the subject is admitted to a medical facility with a suspected (e.g., unconfirmed) or confirmed diagnosis of COVID-19 or any viral disease, whether the viral disease is confirmed by RT-PCR-ELISA (reverse transcriptase/polymerase chain reaction coupled with an enzyme-linked immunosorbent assay), such as the Cobas® SARS-CoV-2 RT-PCR test provided by F. Hoffman-La Roche AG, or other diagnosis tool (e.g., any diagnostic tool described in Section II.A above), symptoms experienced by subject (e.g., cough, fever, muscle ache, shortness of breath, sore throat, loss of sense of smell, conjunctivitis, gastrointestinal symptoms, head cold, headache, etc.), and other suitable attributes characterizing a subject. A subject attribute (e.g., age, existing medical condition, previous operation or a previous medical condition) may be a comorbidity for COVID-19. As an illustrative example, one of the subject attributes of a subject record may include the Cobas® SARS-CoV-2 test provided by F. Hoffman-La Roche AG, which is a real-time RT-PCR test designed for the qualitative detection of SARS-CoV-2 in nasopharyngeal and oropharyngeal swab samples from subjects. Other commercially-available COVID-19 PCR tests include, but are not limited to, the COVID-19 Assay PCR test provided by Diagnostic Solutions Laboratory®; the SARS-CoV-2 Molecular Detection Assay, which is a PCR test provided by Mayo Clinic Laboratories; the Fast Track Diagnostics (FTD) SARS-CoV-2 Assay, which is a PCR test provided by Seimens Healthineers/Fast Track Diagnostics; the SARS-CoV-2 PCR Assay provided by Stanford Health Care Clinical Virology Laboratory; the RealTime SARS-CoV-2 EUA Test, which is a PCR test provided by Abbott®; and any other suitable commercially-available COVID-19 diagnostic test.

At block 730, cloud server 135 generates an array representation for the subject. Cloud server 135 can transform the set of subject attributes included in the subject record into a vector represented in a domain space, such as a Euclidean space. For example, cloud server 135 can perform SVD on the set of subject attributes to generate one or more numerical representations for each attribute, and then concatenate or otherwise combine the numerical representations into a vector representation.

At block 740, cloud server 135 can input the array representation for the subject into a trained machine-learning model to generate an output. The trained machine-learning model can include a set of parameters that were learned using a set of other subject records stored in a data registry. Each of the set of parameters can include a value learned during training, such as a learned weight (e.g., between a pair of nodes in a neural network) or a learned coefficient. The trained machine-learning model may further be configured with and/or may have been trained using one or hyperparameters. Each hyperparameter may include a value set independently of training. For example, a hyperparameter may include a number of layers in a neural network, a number of nodes in each of one or more layers in a neural network, a learning rate, etc. Each other subject record of the set of other subject records can be associated with another subject who was infected with COVID-19 and potentially subsequently treated using a treatment. Each other subject record of the set of other subject records can include a set of other subject attributes that characterizes the other subject. In some instances, each other subject record of the set of other subject records identifies a treatment and/or a subsequent or recent status of the subject (e.g., recovered, placed on a ventilator, placed in the Intensive Care Unit, passed away, cause of death, etc.). The set of other subject records may be used as training data for the machine-learning model.

The trained machine-learning model may include one or more functions configured to transform the array-representation input into the output using the set of parameters. In some cases, the output may be a size-reduced output, which is an output that has fewer values than a quantity of values in the input or of an initial output generated by the trained machine-learning model. For example, dimensions of an input fed to the trained machine-learning model may be [1, n], where n is a length of multiple subject attributes and/or of aggregated representations of multiple subject attributes.

The size-reduced output may include a single classification or the highest ranked classification (e.g., based on rankings generated based on machine-learning results) from the list of possible classifications. In some instances, an input includes a set of values representing multiple subject attributes, and a reduced-dimensionality output includes fewer values than those in the input (e.g., 1, 2, 3, or 4 values). In some instances, a size and/or dimensionality of an output is the same or larger than a size and/or dimensionality of an input. For example, an output may identify a significance attributed to each input value along with a cumulative out (e.g., representing a predicted diagnosis or potential treatment).

The size-reduced output may be reduced or condensed from the initial output of the trained machine-learning model. For example, a function can transform a numerical value of an input for the trained machine-learning model to a numerical value of an output of the trained machine-learning model. The function can represent a combination (e.g., a weighted combination) of the set of parameters (e.g., weights), which are multiplied with the array representation, to generate the output of the trained machine-learning model.

At block 750, cloud server 135 determines, based on the output of the trained machine-learning model, that the subject record corresponds to criteria of a COVID-19 diagnosis and/or factors indicative of suitability of a particular COVID-19 treatment. For example, criteria for diagnosing a subject with COVID-19 or a suspected diagnosis of COVID-19 includes existence of any one or more of the following examples of symptoms: cough, fever, muscle ache or pain, shortness of breath, sore throat, loss of sense of taste or smell, conjunctivitis, gastrointestinal symptoms, head cold, headache, fast breathing, chills, shaking with chills, inflammation, vomiting, diarrhea, rash, cracked lips, red eyes, swelling of the hands or feet, joint pain, dizziness, paleness, tiredness, chest pain, a positive or suspected positive result of a COVID-19 test, whether the subject is a smoker, and other suitable symptoms. In some embodiments, the criteria are developed by physicians or other medical professionals associated with a medical facility of government entity. In other embodiments, the criteria are automatically learned using the trained machine-learning model. For example, the criteria are learned by training the machine-learning model to detect patterns of subject attributes or symptoms across subjects who were diagnosed with COVID-19 (e.g., confirmed positive results of a COVID-19 test).

Cloud server 135 may determine, based on the output of the trained machine-learning model, factors indicative of the suitability of a particular COVID-19 treatment. Cloud server 135 may determine a set of treatments that were prescribed across the other subjects diagnosed at a previous time with COVID-19 (e.g., the other subjects associated with the other set of subject records) and/or may retrieve a set of potential COVID-19 treatments. Non-limiting examples of COVID-19 treatments include any treatment for COVID-19 described in Section II.B above, rest, increasing hydration, and/or any therapeutic treatments being studied, including, but not limited to, Remdesivir, Tocilizumab, Beta Interferon, Favipiravir, Oxygen, Hydroxychloroquine, Azithromycin, Convalescent plasma, Colchicine, Ivermectin, and any other suitable therapeutic treatment. Each treatment of the set of treatments provided across the other subjects may be associated with one or more factors. Of the group of other subjects treated for COVID-19, a sub-group of subjects prescribed a certain treatment may be associated with a set of factors. For example, a vast majority or all of a sub-group of subjects who were 20-25 years old and otherwise have no comorbidities or health conditions, may have been prescribed the treatment of recovering from home with rest, hydration, and medications for fever. Further, the sub-group of subjects may have entirely or predominately responded positively to the treatment of recovery at home without anti-viral medication. As another example, at least some of a sub-group of subjects who are between 60-70 years old and who have a comorbidity of heart disease, may have (at least initially) been prescribed the treatment of recovery at home. Unlike with the sub-group of subjects between 20-25, the at least some of this sub-group of subjects may not have responded positively to the treatment, for example, as determined by the viral disease progressing in the subjects of the sub-group. In this example, the factors of between 60-70 years old and a comorbidity of heart disease correspond to a negative responsiveness for the treatment of home recovery. As yet another example, for the same sub-group of subjects between 60-70 years old and the comorbidity of heart disease, the treatment of Remdesivir may correspond to a positive responsiveness for subjects in the sub-group, as determined by an overall abatement, reduction, or cessation of symptoms. These types of data may result in the machine-learning model having been trained to predict different types of treatment recommendations based on different subject attributes.

Figure 8:
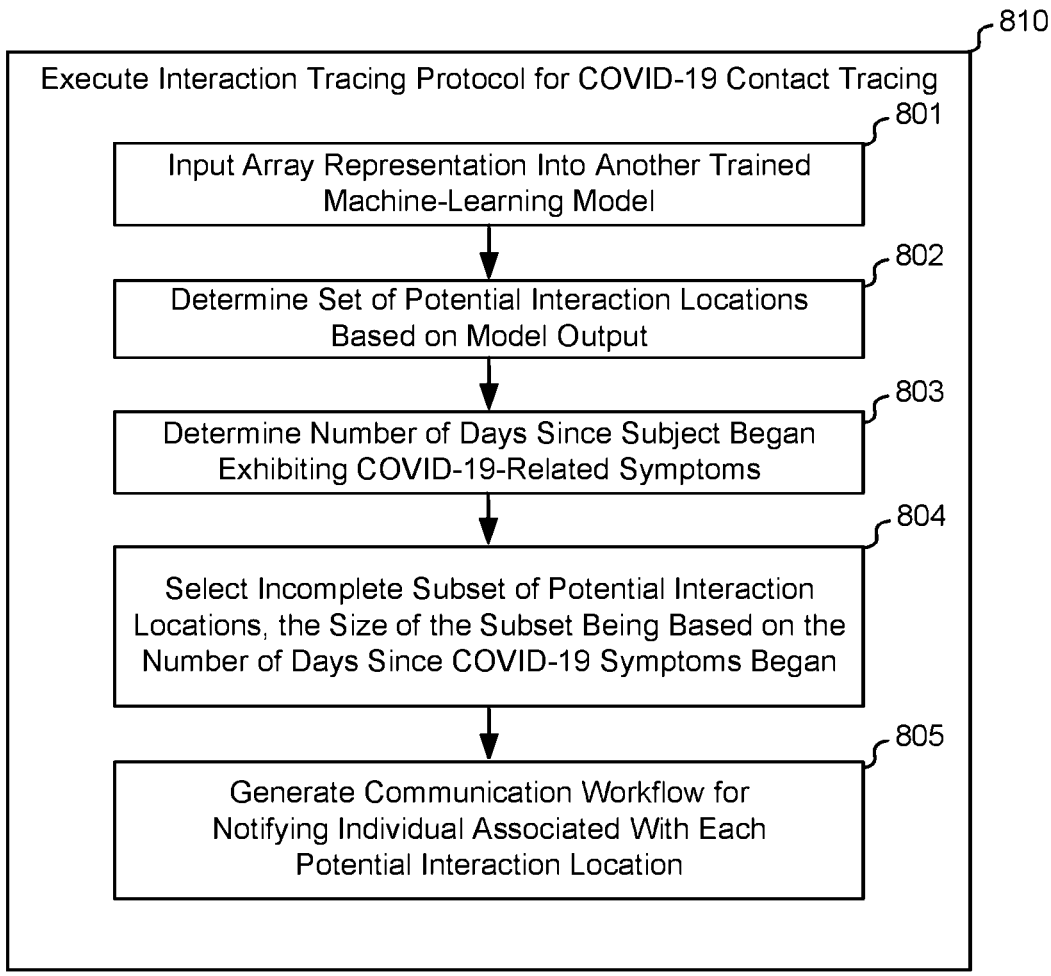
FIG. 8 is a flowchart illustrating an example of a process for tracing interactions with a subject diagnosed with COVID-19, according to some aspects of the present disclosure.

At block 760, cloud server 135 can output on the interface an indication that the subject record corresponds to the criteria of a COVID-19 diagnosis and/or factors indicative of suitability of a particular COVID-19 treatment. As an illustrative example, the interface displays an indication that certain subject attributes of the subject (e.g., the symptoms experienced by the subject) correspond to a COVID-19 diagnosis. The interface displays a list including the subject attributes of the subject that correspond to a COVID-19 diagnosis (e.g., being older than an age threshold and/or having a smoking history). As another illustrative example, the interface displays a list of possible treatments for COVID-19. Next to each possible treatment in the list, the interface displays a score or visual indicator representing the subject's likely responsiveness to the treatment. The likely responsiveness is determined based on an output of the trained machine-learning model, which is trained to learn patterns between a treatment, subject attributes of subjects prescribed the treatment, and the responsiveness of those subjects. A physician exploring COVID-19 treatments for the subject can view the list of possible treatments and the subject's likely responsiveness to each treatment FIG. 8 is a flowchart illustrating process 800 for tracing interactions with a subject diagnosed with COVID-19. Process 800 can be performed by cloud server 135 as functionality of the COVID-19 module integrated into the cloud-based application, as describe with respect to FIG. 7. For example, cloud server 135 can store interface data, which, when loaded onto a user device, causes an interface to be displayed on the user device. The interface may be configured to display potential travel locations for the subject to assist a physician and the subject in contact tracing once the subject has been diagnosed with COVID-19. Cloud server 135 may execute an interaction tracing protocol 810, which facilitates the physician and/or subject in contact tracing to determine other individuals who may have been infected by the subject. Often a subject or a physician experience difficulty in performing robust contact tracing due to the inability of the subject to remember or due to the inaccessibility of the subject (e.g., if the subject is in the ICU), and thus, interaction tracing protocol 810 can be used to assist in the contact tracing process. The interaction tracing protocol

810 may be executable code included in the COVID-19 module, which can be integrated into the cloud-based application.

Interaction tracing protocol 810 may be executed automatically or manually after the subject has been diagnosed with COVID-19 (e.g., after block 760 of FIG. 7). For example, interaction tracing protocol 810 is executed in response to determining that the subject record corresponds to the criteria of a COVID-19 diagnosis. The subject may further be tested for COVID-19 to confirm a suspected diagnosis of COVID-19 based on the subject's symptoms. After the suspected diagnosis or the confirmed diagnosis, cloud server 135 executes interaction tracing protocol 810 to identify potential locations to which the subject traveled or a list of potential human interactions of the subject to assist the treating physician and/or the subject in contact tracing.

At block 801, cloud server 135 inputs the array representation for the subject into another trained machine-learning model. The other trained machine-learning model may be a different model from the machine-learning model described with respect to FIG. 7. The trained machine-learning model, described with respect to FIG. 8, may have been trained to generate output indicative of potential interaction locations of subjects. The machine-learning model may be configured as a logistic regression model, an ensemble learning model, a nearest neighbor or collaborative filtering model, or any other suitable type of machine-learning model. For example, cloud server 135 may detect that the subject is a college student based on one or more subject attributes included in the subject record of the subject. The trained machine-learning model described with respect to FIG. 8 may be trained to output recommended locations to investigate based on a likelihood that the subject traveled there. For the subject who is a student, the trained machine-learning model may recommend that contact tracing include evaluating potential contacts with other students at the subject's school, at the subject's dormitory, one or more coffee shops near the student's campus at which students often study, and so on. As another example, for a subject who is a health care professional (HCP), the trained machine-learning model may recommend that contact tracing include evaluating potential contacts with individuals at the HCP's medical facility or the HCP's apartment complex or home.

The other trained machine-learning model (the model described with respect to FIG. 8) may be trained using the set of other subject records and/or any other data set, such as a third-party data set. In some embodiments, the other trained machine-learning model may be trained based on previous contact tracing performed with respect to a medical entity or a government entity. For example, the training data set may include other instances of contact tracing for other subjects who were diagnosed with COVID-19. The training data set may include another subject, the set of attributes of that subject, and a list of potential interaction locations identified by that subject. The training data may also include an indication of whether or not potential human interactions were discovered and/or whether those potential human interactions were likely to have been infected by the subject. The other trained machine-learning model can be trained to detect patterns or other correlations within the training data.

At block 802, cloud server 135 determines, based on the other output of the other trained machine-learning model, a set of potential interaction locations associated with the subject. A potential interaction location is a location that the subject is probabilistically likely to have traveled to or otherwise visited. Each potential interaction location of the set of potential interaction locations indicates a potential location (e.g., a specific college campus) or a location type (e.g., coffee shops in a zip code) to which the subject traveled.

At block 803, cloud server 135 determines a number of days since the subject began exhibiting symptoms. The number of days since the subject began exhibiting symptoms indicates a size of a viral load being released by the subject. Generally, the size of a viral load released by a subject infected by a virus increases for a time period after symptoms begin. For example, on a given day, a subject who began exhibiting symptoms 2 days ago may be releasing a smaller viral load of the Severe Acute Respiratory Syndrome Coronavirus 2 (SARS-CoV-2) than another subject who began exhibiting symptoms 10 days ago.

At block 804, cloud server 135 selects an incomplete subset of the set of potential interaction locations. A size of the incomplete subset selected from the set of potential interaction locations may be determined based on the number of days since the subject began exhibiting symptoms. For example, the size of the incomplete subset is proportional to the number of days since the symptoms began (presuming the subject has not yet recovered) due to the size of the viral load released by the subject being greater the more time the subject has been exhibiting symptoms. The size of the incomplete subset of the set of potential interaction locations may correspond to a number of potential interaction locations to investigate as part of contact tracing. As an illustrative example, if on the day the subject was admitted to the medical facility, the subject has only been exhibiting symptoms for one day, the subset of the potential interaction locations may include the subject's home only. However, if on the day the subject was admitted to the medical facility, the subject has been exhibiting symptoms for 12 days, the subset of the potential interaction locations may include more potential locations to investigate due to the increased risk of infecting other individuals. Thus, the subset of potential interaction locations may include the subject's apartment, a neighbor's apartment, the mailroom of the apartment building, the subject's gym, any social gatherings the subject has attended since exhibiting symptoms, and so on.

At block 805, cloud server 135 generates a communication workflow for causing a communication to be transmitted notifying one or more individuals associated with each potential interaction location of the incomplete subset of the set of potential interaction locations. For example, the communication workflow may include steps to take or contact information for a health care worker (e.g., a nurse) to communicate with individuals associated with the potential interaction location. If subset of potential interaction locations includes a neighbor's apartment, then the communication workflow would include instructions for the health care worker to contact the neighbor living at that apartment. The communication workflow may be generated after the subject has approved or authorized notifying the individuals associated with each potential interaction location included in the incomplete subset. Non-limiting examples of communications transmitted may include phone calls, emails (including links), video conferences, mailed letters, in-person visits, and other suitable forms of communication.

In some embodiments, cloud server 135 receives one or more responses to the communication (e.g., from the individual, such as the neighbor of the subject diagnosed with COVID-19). Cloud server 135 identifies the one or more potential human interactions using the one or more responses to the communication. Cloud server 135 may generate, for each potential human interaction of the one or more potential human interactions, a test-request workflow for assigning a COVID-19 test to the potential human interaction. The test-request workflow may include determining a number of COVID-19 tests available and selecting or reserving a COVID-19 test for the potential human interaction. For example, the test-request workflow may select the Cobas® SARS-CoV-2 RT-PCR test provided by F. Hoffman-La Roche AG.

Figure 9:
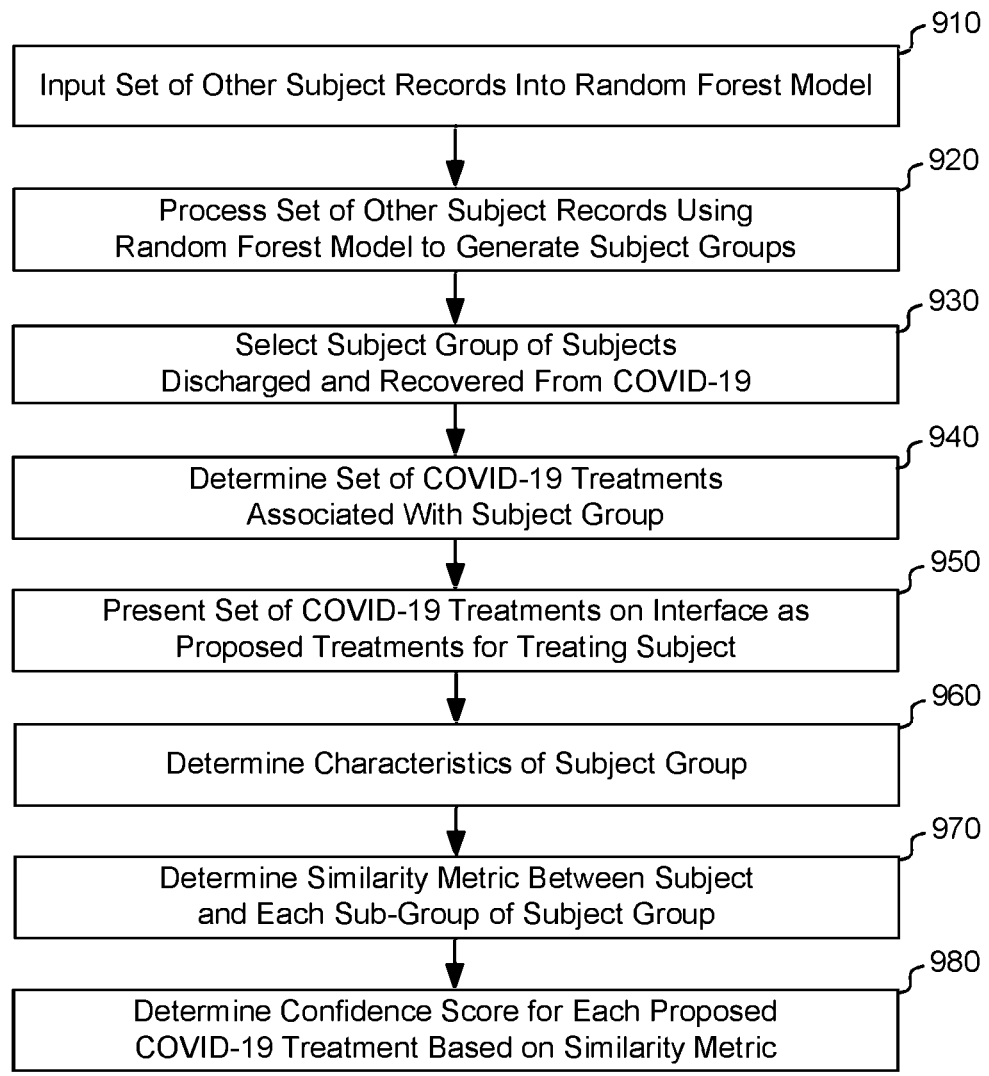
FIG. 9 is a flowchart illustrating an example of a process for determining a set of proposed treatments for treating COVID-19 and corresponding confidence scores for treating a subject, according to some aspects of the present disclosure.

FIG. 9 is a flowchart illustrating process 900 for determining a set of proposed treatments and corresponding confidence scores for treating a subject. Process 900 can be performed by cloud server 135 as functionality of the COVID-19 module integrated into the cloud-based application, as describe with respect to FIG. 7. For example, cloud server 135 can store interface data, which, when loaded onto a user device, causes an interface to be displayed on the user device. The interface may be configured to display a set of proposed treatments for treating a subject with COVID-19, and, for each proposed treatment, a visual indicator representing the subject's predicted responsiveness of the proposed treatment. Cloud server 135 may execute executable code to perform process 900, which assists the physician in selecting a treatment for a subject diagnosed with COVID-19. Process 900 may be executable code included in the COVID-19 module, which can be integrated into the cloud-based application. Process 900 may be performed in response to determining that the subject record corresponds to the criteria of a COVID-19 diagnosis.

At block 910, cloud server 135 inputs the set of other subject records into a random forest model. The set of other subject records represents other subjects who have been diagnosed with and subsequently treated for COVID-19, and the outcome of treating the other subject. The random forest model may be trained to iterate through subject records (or other input data) to determine the optimal segmenting attribute and segmenting threshold that differentiates an outcome associated with the inputted subject records. For example, the random forest model can be used to automatically determine that Subject Attribute 123 can be split into three related subject attributes: Subject attribute 234, family attribute 345, and medication attribute 456. The splitting of the input data may be determined by executing one or more algorithms, such as random forest or gradient boosting techniques. Further, the splitting of the decision tree may indicate which subject attributes contributed to differentiating the various outcomes of subjects (e.g., whether the subject recovered, died, was placed on a ventilator, etc.).

At block 920, cloud server 135 processes the set of other subject records using the random forest model. Processing the set of other subject records can include determining one or more segmenting thresholds for segmenting the set of other subject records into one or more subject groups (e.g., a subset of the set of other subject records). Each subject group of the one or more subject groups may correspond to a subject outcome (e.g., subjects who recovered from COVID-19, subjects who passed away from COVID-19, subjects who were placed on a ventilator due to COVID-19, etc.).

At block 930, cloud server 135 selects a subject group of the one or more subject groups. The subject groups correspond to a particular outcome. For attributes associated with a positive outcome, such as a full recovery from COVID-19, cloud server 135 selects the subject group that includes subjects who have been discharged from a medical facility after recovering from COVID-19.

At block 940, cloud server 135 determines a set of treatments associated with the selected subject group. Each treatment of the set of treatments having been prescribed to at least one of the subjects who have been discharged after recovering from COVID-19. The set of treatments may include the treatments prescribed across the group of subjects who recovered from COVID-19. At block 950, cloud server 135 may cause the set of treatments prescribed across the group of subjects who recovered from COVID-19 and have been discharged (e.g., a positive outcome) to be displayed on the interface at a user device. The set of treatments may be displayed to a user (e.g., a physician) as proposed treatments for the subject.

At block 960, cloud server 135 determines one or more characteristics associated with the selected subject group. Each characteristic of the one or more characteristics may be determined based on a segmenting threshold of the one or more segmenting thresholds determined by the random forest model. The points at which the tree splits into one or more branches may be a segmenting threshold determined by the random forest or gradient boosting model. As an illustrative example, the random forest model may iterate through the set of other subject records to define a tree structure for representing the set of other subject records. Leaf nodes of the tree structure may be determined based on outcome of a treatment. For example, one leaf node may represent subjects who recovered, another leaf node may represents subjects who passed away, and another leaf node may represent subjects who were placed on a ventilator, and so on. For the leaf node representing the subjects who recovered from COVID-19, the random forest model may determine the characteristics that contributed to the group of subjects who recovered. The characteristics may be determined by executing the random forest or gradient boosting techniques, for example. Further, the characteristics may include a first characteristic of "seven or less days since symptoms began," a second characteristic of "subject treated with Remdesivir," and a third characteristic of "subject had no comorbidities." Each characteristic may be associated with a sub-group of the selected subject group or a subject attribute included in a subject record.

At block 970, cloud server 135 determines a similarity metric between the subject record and each characteristic of the one or more characteristics that were determined to contribute creating the selected subject group. A characteristic may represent a sub-group of the subject group represented by a leaf node. The sub-group may have been prescribed an incomplete subset of the set of treatments. In some embodiments, a similarity metric is determined by determining a distance in a domain space (e.g., Euclidean space) between the array representation of the subject to the average array representation of the sub-group(s) associated with the determined characteristics of the subject group represented by a leaf node. The similarity metric may be a score representing an extent to which the subject record of the subject diagnosed with COVID-19 is similar to or matches the characteristics of the selected subject group. In some embodiments, the similarity metric may be calculated based on a number of characteristics that are included in the subject record. Continuing with the example above, the subject record of the subject diagnosed with COVID-19 may be compared with the first, second, and third characteristics described above to generate the similarity metric. If the subject record includes an attribute of "seven or less days since symptoms began" and another attribute of "subject had no comorbidities," then the similarity metric may be "2." Any suitable technique may be executed to calculate the similarity metric.

At block 980, cloud server 135 determines a confidence score for each proposed treatment of the set of treatments. The confidence score may be determined based on the similarity metric. Further, the confidence score may be calculated to represent the subject's predicted responsiveness of the proposed treatment. The predicted responsiveness may be based on an extent to which the subject attributes of the subject diagnosed with COVID-19 is similar to or matches the characteristics of each subject group defined in the random forest model.

COVID-19 is a complex viral disease to diagnose and/or treat, given that there is still much to learn about SARS-CoV-2. New studies introduce new results at a fast pace. The findings of the studies are often updated or found to be incorrect later. Symptom profiles for COVID-19 may be supplemented, modified, or removed by the cloud-based application based on new information about SARS-CoV-2. As an illustrative example, children were thought to be largely or partially immune from COVID-19. However, subsequent studies found that SARS-CoV may trigger immune system overreactions associated with Kawasaki's disease in children (e.g., children under 5 years old). In this case, the COVID-19 symptom profile can be updated to include conditions in children or other symptoms of Kawasaki's disease, such as rash, swollen hands or feed, abdominal pain or other digestive system symptoms, heart conditions, and the like. Thus, building a dynamic cloud-based platform that collects data from a distributed network of institutions and care providers and that executes trained artificial intelligence (AI) models to frequently or repeatedly process new data may be extraordinarily valuable. Further, having trained AI models that can frequently or repeatedly track the ever-changing landscape of diagnosis, treatment, and/or treatment-result patterns can substantially advance medicine. As an illustrative example, an attending physician may treat subjects exhibiting a difficulty-breathing symptom differently, if the physician knew whether or not COVID-19 had entered their community. As another illustrative example, a particular treatment may be more effective in certain locations, perhaps given the effectiveness of the treatment against a particular strain of SARS-CoV-2 that is prevalent in a geographical region. Thus, a cloud-based application that uses outputs of trained AI models to predict responsiveness to treatment, for example, can be a significant technical advantage in the complex and fast-paced environment of COVID-19 research.

It will be appreciated that any machine-learning or artificial-intelligence algorithms may be executed to generate any of the trained machine-learning models described herein. Various different types and technologies of artificial-intelligence-based and machine-learning models may be trained and then executed to generate one or more outputs predictive of user outcomes for performing a protocol or function. Non-limiting examples of models include Naïve Bayes models, random forest or gradient boosting models, logistic regression models, deep learning neural networks, ensemble models, supervised learning models, unsupervised learning models, collaborative filtering models, and any other suitable machine-learning or artificial intelligence models.

It will also be appreciated that the present disclosure is not limited to diagnosing and treating COVID-19. The COVID-19 module may be configured to identify potential diagnoses or potential treatments for any disease, condition, area of study, or disorder, including, but not limited to, oncology, including cancers of the lung, breast, colorectal, prostate, stomach, liver, cervix uteri (cervical), esophagus, bladder, kidney, pancreas, endometrium, oral, thyroid, brain, ovary, skin, and gall bladder; solid tumors, such as sarcomas and carcinomas, cancers of the immune system including lymphomas (such as Hodgkin or non-Hodgkin), and cancers of the blood (hematological cancers) and bone marrow, such as leukemias (such as Acute lymphocytic leukemia (ALL) and Acute myeloid leukemia (AML)), lymphomas, and myeloma. Additional disorders include blood disorders such as anemia, bleeding disorders such as hemophilia, blood clots, ophthalmology disorders, including diabetic retinopathy, glaucoma, and macular degeneration, neurological disorders, including multiple sclerosis, Parkinson's, disease, spinal muscular atrophy, Huntington's Disease, amyotrophic lateral sclerosis (ALS), and Alzheimer's Disease, autoimmune disorders, including multiple sclerosis, diabetes, systemic lupus erythematosus, myasthenia gravis, inflammatory bowel disease (IBD), psoriasis, Guillain-Barre syndrome, Chronic inflammatory demyelinating polyneuropathy (CIDP), Graves' disease, Hashimoto's thyroiditis, eczema, vasculitis, allergies and asthma.

Other diseases and disorders include but are not limited to kidney disease, liver disease, heart disease, strokes, gastrointestinal disorders such as celiac disease, Crohn's disease, diverticular disease, Irritable Bowel Syndrome (IBS), Gastroesophageal Reflux Disease (GERD) and peptic ulcer, arthritis, sexually transmitted diseases, high blood pressure, bacterial and viral infections, parasitic infections, connective tissue diseases, celiac disease, osteoporosis, diabetes, lupus, diseases of the central and peripheral nervous systems, such as Attention deficit/hyperactivity disorder (ADHD), catalepsy, encephalitis, epilepsy and seizures, peripheral neuropathy, meningitis, migraine, myelopathy, autism, bipolar disorder, and depression.

IV. EXAMPLE

A 25-year-old 5'9" male arrives at a hospital in Topeka, KS, USA. He reports that he has had difficulty breathing for three days. He has a temperature of 103° F. He completes intake forms that note his employment at a particular grocery store and that he does not smoke. A nurse uses a peak flow meter and determines that the subject's peak flow rate is 555 L/min.

At intake, a nurse enters the above information into an online interface, which returns a result predicting that there is a 96% chance that the subject has COVID-19. The interface notes that factors consistent with the diagnosis include the reported breathing difficulty, fever, occupation, peak flow rate and a recent acceleration in cases in a neighboring city (Kansas City, MO).

The Cobas® SARS-CoV-2 test is administered, and positive results are received. A laboratory technician interacts with the interface to provide this additional test result in the subject's record. A status of the subject presented in the interface then changes from "Likely Positive" to "Positive".

A physician then interacts with the interface and requests treatment-recommendation information. A remote server uses a nearest-neighbor algorithm to identify 100 subjects having record data similar to that of the subject. Peak flow rates of all similar subjects were within 50 L/min from that of the subject; ages of all similar subjects were within 3 years from that of the subject; and temperatures of all similar subjects were within 3° F. of that of the subject. Of the similar subjects, 25% were within 100 miles from a location of the hospital. A similarity metric was assigned to each of the similar subjects based on a degree to which record data matched that of the subject's record, and fields were weighted differently (e.g., such that symptom overlap is more highly weighted than occupation overlap).

For each similar subject, the remote server identifies an initial COVID-19 treatment and whether the subject was alive and released from the hospital within two weeks from the treatment administration. Across the subject set, 6 different first-line COVID-19 drugs were identified. Two of these treatments were received by a sub-threshold percentage of the similar-subject set (<5 subjects). For each of the remaining 4 treatments (tocilizumab, remdesivir, lopinavir-ritonavir, and favipiravir), a percentage of the subjects having received the treatments were alive and released from the hospital within two weeks from the treatment administration is determined.

The interface returns a result that identifies the 4 treatments and, for each of the 4 treatments: an average of the similarity metrics across the similar subjects who received the treatment; a percentage of the 100 similar subjects who received the treatment; and the percentage of the similar subjects having received the treatment who were alive and released from the hospital within two weeks from treatment. The interface further allows the user to click on one of the treatment names, which causes the interface to present links to versions of the records of the similar subjects associated with the treatment. The versions are redacted and/or generalized in a manner to comply with applicable data-privacy restrictions. The physician determines that the group of subjects associated with the tocilizumab treatment is most similar to the subject and that the group's response to the treatment is favorable. Thus, the physician prescribes tocilizumab to the subject and coordinates for a nurse to update the subject's record to reflect the treatment prescription via interface interaction.

V. Additional Considerations

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

VI. Claims Bank

As used below, any reference to a series of examples is to be understood as a reference to each of those examples disjunctively (e.g., "Examples 1-4" is to be understood as "Examples 1, 2, 3, or 4").

Example 1 is a computer-implemented method comprising: receiving input corresponding to a selection of an identifier of a subject record associated with a subject, the identifier of the subject record being selected using an interface; retrieving the subject record from a data store, the subject record including a set of subject attributes; generating an array representation for the subject, the array representation being generated by transforming the set of subject attributes into the array representation represented in a domain space; inputting the array representation for the subject into a trained machine-learning model to generate an output that is size-reduced, the trained machine-learning model comprising: a set of parameters that were learned using a set of other subject records stored in a data registry, each other subject record of the set of other subject records being associated with another subject who was infected with COVID-19 and subsequently treated using a treatment; and one or more functions configured to transform array-representation input into size-reduced output using the set of parameters; determining, based on the output, that the subject record corresponds to criteria of a COVID-19 diagnosis and/or factors indicative of suitability of a particular COVID-19 treatment; and outputting an indication that the subject record corresponds to the criteria of a COVID-19 diagnosis and/or factors indicative of suitability of a particular COVID-19 treatment.

Example 2 is the computer-implemented method of example(s) 1, further comprising: in response to determining that the subject record corresponds to the criteria of a COVID-19 diagnosis: executing an interaction tracing protocol configured to detect an identity of one or more potential human interactions with the subject, the execution of the interaction tracing protocol including: inputting the array representation for the subject into another trained machine-learning model, the other trained machine-learning model having been trained to generate another output indicative of potential interaction locations of subjects; determining, based on the other output of the other trained machine-learning model, a set of potential interaction locations associated with the subject, each potential interaction location of the set of potential interaction locations indicating a prediction of a potential location or location type to which the subject traveled; determining a number of days since the subject began exhibiting symptoms, the number of days since the subject began exhibiting symptoms being indicative of a size of a viral load having been released by the subject; selecting an incomplete subset of the set of potential interaction locations, wherein a size of the incomplete subset selected from the set of potential interaction locations is determined based on the number of days since the subject began exhibiting symptoms; and generating a communication workflow for causing a communication to be transmitted notifying one or more individuals associated with each potential interaction location of the incomplete subset of the set of potential interaction locations, wherein the communication is transmitted upon receiving authorization from the subject.

Example 3 is the computer-implemented method of example(s) 1-2, further comprising: receiving one or more responses to the communication; identifying the one or more potential human interactions using the one or more responses to the communication; and generating, for each potential human interaction of the one or more potential human interactions, a test-request workflow for assigning a COVID-19 test to the potential human interaction.

Example 4 is the computer-implemented method of any of example(s)s 1-3, further comprising: in response to determining that the subject record corresponds to the criteria of a COVID-19 diagnosis: inputting the set of other subject records into a random forest model, the random forest model defining a tree structure associated with the set of other subject records, the tree structure including one or more nodes, and each node of the one or more nodes representing a subset of the set of other subject records; processing the set of other subject records using the random forest model, the processing including determining one or more segmenting thresholds for segmenting the set of other subject records into one or more subsets of subject records, each subset of subject records corresponding to a leaf node of the tree structure, the leaf node representing a subject outcome, and each segmenting threshold of the one or more segmenting thresholds causing the tree structure to branch into one or more child nodes; selecting a subset of the one or more subsets of subject records, the selected subset corresponding to subjects who have been discharged after recovering from COVID-19; determining a set of treatments associated with the selected subset, each treatment of the set of treatments having been prescribed to at least one of the subjects who has been discharged after recovering from COVID-19; and presenting, on the interface, the set of treatments as proposed treatments for treating the subject.

Example 5 is the computer-implemented method of example(s) 1-4, wherein processing the set of other subject records further comprises: determining one or more characteristics associated with the selected subset, each characteristic of the one or more characteristics being determined based on a segmenting threshold of the one or more segmenting thresholds, and each characteristic contributing to filtering the set of other subject records into the selected subset; determining a similarity metric between the subject record and the one or more characteristics of the selected subset; and determining a confidence score for each proposed treatment of the set of treatments, the confidence score being determined based on the similarity metric.

Example 6 is the computer-implemented method of example(s) 1-5, further comprising: prescribing a treatment workflow associated with the COVID-19 diagnosis, the treatment workflow including a treatment of the set of treatments, the treatment being performable by a physician or medical professional.

Example 7 is the computer-implemented method of any of example(s) 1-6, wherein the set of subject attributes characterizing the subject includes any one or more from a group comprised of: one or more comorbidities, a smoking status of the subject, a suspected diagnosis of a viral disease, a confirmed diagnosis of a viral disease, a testing technology used to confirm a diagnosis, or a treatment for a disease or condition.

Example 8 is the computer-implemented method of any of example(s) 1-7, wherein the subject was admitted to a medical facility as a suspected case of COVID-19.

Example 9 is the computer-implemented method any of example(s) 1-8, wherein a COVID-19 RT-PCR test was performed on the subject to confirm that the subject has COVID-19.

Example 10 is the system of any of example(s) 1-9, wherein the set of treatments includes any one or more from a group comprised of: an antiviral, supplemental oxygen, mechanical ventilation, extracorporeal membrane oxygenation, convalescent plasma, SARS-CoV-2 immune globulins for treating COVID-19, immunomodulators, corticosteroids, or Antithrombotic Therapy.

Example 11 is a system comprising: one or more processors; and a non-transitory computer-readable storage medium containing instructions which, when executed on the one or more processors, cause the one or more processors to perform operations including: receiving input corresponding to a selection of an identifier of a subject record associated with a subject, the identifier of the subject record being selected using an interface; retrieving the subject record from a data store, the subject record including a set of subject attributes; generating an array representation for the subject, the array representation being generated by transforming the set of subject attributes into the array representation represented in a domain space; inputting the array representation for the subject into a trained machine-learning model to generate an output that is size-reduced, the trained machine-learning model comprising: a set of parameters that were learned using a set of other subject records stored in a data registry, each other subject record of the set of other subject records being associated with another subject who was infected with COVID-19 and subsequently treated using a treatment; and one or more functions configured to transform array-representation input into size-reduced output using the set of parameters; determining, based on the output, that the subject record corresponds to criteria of a COVID-19 diagnosis and/or factors indicative of suitability of a particular COVID-19 treatment; and outputting an indication that the subject record corresponds to the criteria of a COVID-19 diagnosis and/or factors indicative of suitability of a particular COVID-19 treatment.

Example 12 is the system of example(s) 11, wherein the operations further comprise: in response to determining that the subject record corresponds to the criteria of a COVID-19 diagnosis: executing an interaction tracing protocol configured to detect an identity of one or more potential human interactions with the subject, the execution of the interaction tracing protocol including: inputting the array representation for the subject into another trained machine-learning model, the other trained machine-learning model having been trained to generate another output indicative of potential interaction locations of subjects; determining, based on the other output of the other trained machine-learning model, a set of potential interaction locations associated with the subject, each potential interaction location of the set of potential interaction locations indicating a prediction of a potential location or location type to which the subject traveled; determining a number of days since the subject began exhibiting symptoms, the number of days since the subject began exhibiting symptoms being indicative of a size of a viral load having been released by the subject; selecting an incomplete subset of the set of potential interaction locations, wherein a size of the incomplete subset selected from the set of potential interaction locations is determined based on the number of days since the subject began exhibiting symptoms; and generating a communication workflow for causing a communication to be transmitted notifying one or more individuals associated with each potential interaction location of the incomplete subset of the set of potential interaction locations, wherein the communication is transmitted upon receiving authorization from the subject.

Example 13 is the system of example(s) 11-12, wherein the operations further comprise: receiving one or more responses to the communication; identifying the one or more potential human interactions using the one or more responses to the communication; and generating, for each potential human interaction of the one or more potential human interactions, a test-request workflow for assigning a COVID-19 test to the potential human interaction.

Example 14 is the system of any of example(s) 11-13, wherein the operations further comprise: in response to determining that the subject record corresponds to the criteria of a COVID-19 diagnosis: inputting the set of other subject records into a random forest model, the random forest model defining a tree structure associated with the set of other subject records, the tree structure including one or more nodes, and each node of the one or more nodes representing a subset of the set of other subject records; processing the set of other subject records using the random forest model, the processing including determining one or more segmenting thresholds for segmenting the set of other subject records into one or more subsets of subject records, each subset of subject records corresponding to a leaf node of the tree structure, the leaf node representing a subject outcome, and each segmenting threshold of the one or more segmenting thresholds causing the tree structure to branch into one or more child nodes; selecting a subset of the one or more subsets of subject records, the selected subset corresponding to subjects who have been discharged after recovering from COVID-19; determining a set of treatments associated with the selected subset, each treatment of the set of treatments having been prescribed to at least one of the subjects who has been discharged after recovering from COVID-19; and presenting, on the interface, the set of treatments as proposed treatments for treating the subject.

Example 15 is the system of example(s) 11-14, wherein processing the set of other subject records further comprises: determining one or more characteristics associated with the selected subset, each characteristic of the one or more characteristics being determined based on a segmenting threshold of the one or more segmenting thresholds, and each characteristic contributing to filtering the set of other subject records into the selected subset; determining a similarity metric between the subject record and the one or more characteristics of the selected subset; and determining a confidence score for each proposed treatment of the set of proposed treatments, the confidence score being determined based on the similarity metric.

Example 16 is the system of example(s) 11-15, wherein the operations further comprise: prescribing a treatment workflow associated with the COVID-19 diagnosis, the treatment workflow including a treatment of the set of treatments, the treatment being performable by a physician or medical professional.

Example 17 is the system of any of example(s) 11-16, wherein the set of subject attributes characterizing the subject includes any one or more from a group comprised of: one or more comorbidities, a smoking status of the subject, a suspected diagnosis of a viral disease, a confirmed diagnosis of a viral disease, a testing technology used to confirm a diagnosis, or a treatment for a disease or condition.

Example 18 is the system of any of example(s) 11-17, wherein the subject was admitted to a medical facility as a suspected case of COVID-19.

Example 19 is the system of any of example(s) 11-18, wherein a COVID-19 RT-PCR test was performed on the subject to confirm that the subject has COVID-19.

Example 20 is the system of any of example(s) 11-19, wherein the set of treatments includes any one or more from a group comprised of: an antiviral, supplemental oxygen, mechanical ventilation, extracorporeal membrane oxygenation, convalescent plasma, SARS-CoV-2 immune globulins for treating COVID-19, immunomodulators, corticosteroids, or Antithrombotic Therapy.

What is claimed is:

1. A computer-implemented method comprising:
    receiving input corresponding to a selection of an identifier of a subject record associated with a subject, the identifier of the subject record being selected using an interface;
    retrieving the subject record from a data store, the subject record including a set of subject attributes that medically characterize the subject, the subject attributes including at least a medical diagnosis;
    generating an array representation for the subject, the array representation being generated by transforming the set of subject attributes using singular value decomposition (SVD) to generate one or more numerical representations for each attribute and combine the numerical representations into a vector representation as the array representation;
    inputting the array representation for the subject into a trained machine-learning model, the trained machine-learning model comprising:
        a set of parameters that were learned using a set of other subject records stored in a data registry, each other subject record of the set of other subject records being associated with another subject who was infected with COVID-19 and subsequently treated using a treatment, and each other subject record of the set of other subject records including a respective set of other subject attributes that medically characterize the associated another subject; and
        one or more functions configured to transform array-representation input into size-reduced output using the set of parameters, wherein the one or more functions are configured to repeatedly monitor and aggregate large-scale data from across a plurality of institutions;
    outputting, from the trained machine-learning model, an output that includes a classification for the subject based upon the input and the set of learned parameters;
    determining, based on the output, that the subject record corresponds to criteria of a COVID-19 diagnosis and/or factors indicative of suitability of a particular COVID-19 treatment; and
    in response to determining that the subject record corresponds to the criteria of a COVID-19 diagnosis:

determining, using a random forest model trained to iterate through the set of other subject records, one or more segmenting thresholds for segmenting the set of other subject records into one or more subject groups, each subject group corresponding to a subject outcome, where one of the subject groups corresponds to subjects who have been discharged after recovering from COVID-19;

determining a set of treatments associated with the subject group corresponding to subjects who have been discharged after recovering from COVID-19;

determining, using the random forest model and based on the one or more segmenting thresholds, a set of characteristics determined to contribute to the discharging of the subjects who have been discharged after recovering from COVID-19;

determining a respective similarity metric between the subject record and each characteristic from the set of characteristics by automatically combining numerical representations of the SVD-transformed attributes in a domain space;

determining, based on the similarity metrics, a confidence score for each treatment in the set of treatments; and presenting, on the interface and based on the confidence scores, the set of treatments as proposed treatments for treating the subject.

2. The computer-implemented method of claim 1, further comprising:

causing a communication to be transmitted notifying one or more individuals associated with one or more potential interaction locations between the subject and respective ones of the one or more individuals, wherein the communication is transmitted upon receiving authorization from the subject, and wherein the communication avoids violating data-privacy rules associated with individual locations of the potential interaction locations;

receiving one or more responses to the communication;

identifying one or more potential human interactions using the one or more responses to the communication; and generating, for each potential human interaction of the one or more potential human interactions, a test-request workflow for assigning a COVID-19 test to the potential human interaction.

3. The computer-implemented method of claim 1, further comprising:

prescribing a treatment workflow associated with the COVID-19 diagnosis, the treatment workflow including the particular COVID-19 treatment, the particular COVID-19 treatment being performable by a physician or medical professional.

4. The computer-implemented method of claim 1, wherein the set of subject attributes characterizing the subject includes any one or more from a group comprised of: one or more comorbidities, a smoking status of the subject, a suspected diagnosis of a viral disease, a confirmed diagnosis of a viral disease, a testing technology used to confirm a diagnosis, or a treatment for a disease or condition.

5. A system comprising:

a memory with instructions stored thereon; and a processing device, coupled to the memory and operable to access the memory, wherein the instructions when executed by the processing device, cause the processing device to perform operations including:

receiving input corresponding to a selection of an identifier of a subject record associated with a subject, the identifier of the subject record being selected using an interface;

retrieving the subject record from a data store, the subject record including a set of subject attributes that medically characterize the subject, the subject attributes including at least a medical diagnosis;

generating an array representation for the subject, the array representation being generated by transforming the set of subject attributes using singular value decomposition (SVD) to generate one or more numerical representations for each attribute and combine the numerical representations into a vector representation as the array representation;

inputting the array representation for the subject into a trained machine-learning model to generate an output that is size-reduced, the trained machine-learning model comprising:

a set of parameters that were learned using a set of other subject records stored in a data registry, each other subject record of the set of other subject records being associated with another subject who was infected with COVID-19 and subsequently treated using a treatment; and one or more functions configured to transform array-representation input into size-reduced output using the set of parameters, wherein the one or more functions are configured to repeatedly monitor and aggregate large-scale data from across a plurality of institutions;

outputting, from the trained machine-learning model, an output that includes a classification for the subject based upon the input and the set of learned parameters;

determining, based on the output, that the subject record corresponds to criteria of a COVID-19 diagnosis and/or factors indicative of suitability of a particular COVID-19 treatment; and in response to determining that the subject record corresponds to the criteria of a COVID-19 diagnosis:

determining, using a random forest model trained to iterate through the set of other subject records, one or more segmenting thresholds for segmenting the set of other subject records into one or more subject groups, each subject group corresponding to a subject outcome, where one of the subject groups corresponds to subjects who have been discharged after recovering from COVID-19;

determining a set of treatments associated with the subject group corresponding to subjects who have been discharged after recovering from COVID-19;

determining, using the random forest model and based on the one or more segmenting thresholds, a set of characteristics determined to contribute to the discharging of the subjects who have been discharged after recovering from COVID-19;

determining a respective similarity metric between the subject record and each characteristic from the set of characteristics by automatically combining the numerical representations of the SVD-transformed attributes in a domain space;

determining, based on the similarity metrics, a confidence score for each treatment in the set of treatments; and presenting, on the interface and based on the confidence scores, the set of treatments as proposed treatments for treating the subject.

6. The system of claim 5, wherein the operations further comprise:

causing a communication to be transmitted notifying one or more individuals associated with one or more potential interaction locations between the subject and respective ones of the one or more individuals, wherein the communication is transmitted upon receiving authorization from the subject, and wherein the communication avoids violating data-privacy rules associated with individual locations of the potential interaction locations;

receiving one or more responses to the communication;

identifying one or more potential human interactions using the one or more responses to the communication; and generating, for each potential human interaction of the one or more potential human interactions, a test-request workflow for assigning a COVID-19 test to the potential human interaction.

7. The system of claim 5, wherein the operations further comprise:

prescribing a treatment workflow associated with the COVID-19 diagnosis, the treatment workflow including the particular COVID-19 treatment, the particular COVID-19 treatment being performable by a physician or medical professional.

8. The system of claim 5, wherein the set of subject attributes characterizing the subject includes any one or more from a group comprised of: one or more comorbidities, a smoking status of the subject, a suspected diagnosis of a viral disease, a confirmed diagnosis of a viral disease, a testing technology used to confirm a diagnosis, or a treatment for a disease or condition.

9. The system of claim 5, wherein the subject was admitted to a medical facility as a suspected case of COVID-19.

10. A non-transitory computer-readable medium with instructions stored thereon that, responsive to execution by a processing device, causes the processing device to perform operations comprising:

receiving input corresponding to a selection of an identifier of a subject record associated with a subject, the identifier of the subject record being selected using an interface;

retrieving the subject record from a data store, the subject record including a set of subject attributes that medically characterize the subject, the subject attributes including at least a medical diagnosis;

generating an array representation for the subject, the array representation being generated by transforming the set of subject attributes using singular value decomposition (SVD) to generate one or more numerical representations for each attribute and combine the numerical representations into a vector representation as the array representation;

inputting the array representation for the subject into a trained machine-learning model, the trained machine-learning model comprising:

a set of parameters that were learned using a set of other subject records stored in a data registry, each other subject record of the set of other subject records being associated with another subject who was infected with COVID-19 and subsequently treated using a treatment, and each other subject record of the set of other subject records including a respective set of other subject attributes that medically characterize the associated another subject; and one or more functions configured to transform array-representation input into size-reduced output using the set of parameters, wherein the one or more functions are configured to repeatedly monitor and aggregate large-scale data from across a plurality of institutions;

outputting, from the trained machine-learning model, an output that includes a classification for the subject based upon the input and the set of learned parameters;

determining, based on the output, that the subject record corresponds to criteria of a COVID-19 diagnosis and/or factors indicative of suitability of a particular COVID-19 treatment; and in response to determining that the subject record corresponds to the criteria of a COVID-19 diagnosis:

determining, using a random forest model trained to iterate through the set of other subject records, one or more segmenting thresholds for segmenting the set of other subject records into one or more subject groups, each subject group corresponding to a subject outcome, where one of the subject groups corresponds to subjects who have been discharged after recovering from COVID-19;

determining, using the random forest model, one or more segmenting thresholds for segmenting the set of other subject records into one or more subject groups, each subject group corresponding to a subject outcome, where one of the subject groups corresponds to subjects who have been discharged after recovering from COVID-19;

determining a set of treatments associated with the subject group corresponding to subjects who have been discharged after recovering from COVID-19;

determining, using the random forest model and based on the one or more segmenting thresholds, a set of characteristics determined to contribute to the discharging of the subjects who have been discharged after recovering from COVID-19;

determining a respective similarity metric between the subject record and each characteristic from the set of characteristics by automatically combining the numerical representations of the SVD-transformed attributes in a domain space;

determining, based on the similarity metrics, a confidence score for each treatment in the set of treatments; and presenting, on the interface and based on the confidence scores, the set of treatments as proposed treatments for treating the subject.

11. The non-transitory computer-readable medium of claim 10, wherein the operations further comprise:

causing a communication to be transmitted notifying one or more individuals associated with one or more potential interaction locations between the subject and respective ones of the one or more individuals, wherein the communication is transmitted upon receiving authorization from the subject, and wherein the communication avoids violating data-privacy rules associated with individual locations of the potential interaction locations;

receiving one or more responses to the communication;

identifying one or more potential human interactions using the one or more responses to the communication; and generating, for each potential human interaction of the one or more potential human interactions, a test-request workflow for assigning a COVID-19 test to the potential human interaction.

12. The non-transitory computer-readable medium of claim 10, wherein the operations further comprise:

prescribing a treatment workflow associated with the COVID-19 diagnosis, the treatment workflow including the particular COVID-19 treatment of the set of treatments, the particular COVID-19 treatment being performable by a physician or medical professional.

* * * * *